United States Patent
Gribetz et al.

(10) Patent No.: US 10,665,020 B2
(45) Date of Patent: May 26, 2020

(54) APPARATUSES, METHODS AND SYSTEMS FOR TETHERING 3-D VIRTUAL ELEMENTS TO DIGITAL CONTENT

(71) Applicant: Meta View, Inc., San Mateo, CA (US)

(72) Inventors: Meron Gribetz, Belmont, CA (US); Soren Harner, Palo Alto, CA (US); Sean Scott, Ham Lake, MN (US); Rebecca B. Frank, Los Angeles, CA (US); Duncan McRoberts, Mountain View, CA (US)

(73) Assignee: Meta View, Inc., San Mateo, CA (US)

( * ) Notice: Subject to any disclaimer, the term of this patent is extended or adjusted under 35 U.S.C. 154(b) by 0 days.

(21) Appl. No.: 15/434,039

(22) Filed: Feb. 15, 2017

(65) Prior Publication Data

US 2017/0236320 A1 Aug. 17, 2017

Related U.S. Application Data

(60) Provisional application No. 62/295,471, filed on Feb. 15, 2016.

(51) Int. Cl.
*G06T 19/00* (2011.01)
*G06F 17/22* (2006.01)
*G06F 17/27* (2006.01)

(52) U.S. Cl.
CPC .......... *G06T 19/006* (2013.01); *G06T 19/00* (2013.01); *G06F 17/2247* (2013.01); *G06F 17/272* (2013.01); *G06T 2210/12* (2013.01); *G06T 2210/36* (2013.01)

(58) Field of Classification Search
CPC .............. G06T 19/006; G06Q 30/0643; G06F 17/2247; G06F 3/017
See application file for complete search history.

(56) References Cited

U.S. PATENT DOCUMENTS

| | | | |
|---|---|---|---|
| 5,583,977 A * | 12/1996 | Seidl | G06F 3/04845 345/619 |
| 6,222,554 B1 | 4/2001 | Berry et al. | |
| 9,507,428 B2 | 11/2016 | Ueno et al. | |
| 9,720,505 B2 | 8/2017 | Gribetz et al. | |
| 2003/0032484 A1 | 2/2003 | Oshima et al. | |
| 2003/0154261 A1 | 8/2003 | Doyle et al. | |
| 2004/0164960 A1 | 8/2004 | Jacobus et al. | |
| 2006/0121436 A1 | 6/2006 | Kruse et al. | |

(Continued)

FOREIGN PATENT DOCUMENTS

| | | |
|---|---|---|
| EP | 2615523 | 7/2013 |
| WO | 2001080098 | 10/2001 |

(Continued)

OTHER PUBLICATIONS

Ha, Taejin, Youngho Lee, and Woontack Woo. "Digilog book for temple bell tolling experience based on interactive augmented reality.", Virtual Reality;15.4 (2011): 295-309. (Year: 2011).*

(Continued)

*Primary Examiner* — Daniel F Hajnik
(74) *Attorney, Agent, or Firm* — Andrew Bodendorf

(57) ABSTRACT

Aspects of the disclosed apparatuses, methods and systems provide tethering 3-D virtual elements in digital content, extracting tethering 3-D virtual elements, and manipulating the extracted 3-D virtual elements in a virtual 3-D space.

18 Claims, 15 Drawing Sheets

(56) References Cited

U.S. PATENT DOCUMENTS

| | | | |
|---|---|---|---|
| 2007/0132721 A1* | 6/2007 | Glomski | G06F 3/011 |
| | | | 345/156 |
| 2008/0284729 A1 | 11/2008 | Kurtenbach et al. | |
| 2009/0043674 A1* | 2/2009 | Minsky | G06Q 30/0603 |
| | | | 705/26.8 |
| 2009/0077504 A1 | 3/2009 | Bell et al. | |
| 2010/0066662 A1 | 3/2010 | Tomisawa et al. | |
| 2010/0093435 A1 | 4/2010 | Glaser et al. | |
| 2011/0066658 A1 | 3/2011 | Rhoads et al. | |
| 2011/0145724 A1* | 6/2011 | Tsai | G06F 1/1647 |
| | | | 715/748 |
| 2011/0169927 A1 | 7/2011 | Mages et al. | |
| 2011/0205341 A1 | 8/2011 | Wilson et al. | |
| 2011/0273540 A1 | 11/2011 | Lee et al. | |
| 2012/0105473 A1 | 5/2012 | Bar-Zeev et al. | |
| 2012/0196679 A1 | 8/2012 | Newcombe et al. | |
| 2012/0236025 A1 | 9/2012 | Jacobsen et al. | |
| 2012/0249741 A1 | 10/2012 | Maciocci et al. | |
| 2013/0002591 A1 | 1/2013 | Whytock et al. | |
| 2013/0047075 A1 | 2/2013 | Cooney et al. | |
| 2013/0073932 A1* | 3/2013 | Migos | G06F 15/0291 |
| | | | 715/201 |
| 2013/0321390 A1* | 12/2013 | Latta | G06T 11/00 |
| | | | 345/419 |
| 2014/0002442 A1* | 1/2014 | Lamb | G06F 3/1431 |
| | | | 345/419 |
| 2014/0218361 A1 | 8/2014 | Abe et al. | |
| 2014/0267420 A1 | 9/2014 | Schowengerdt et al. | |
| 2014/0310595 A1 | 10/2014 | Acharya et al. | |
| 2014/0368504 A1 | 12/2014 | Chen et al. | |
| 2015/0033191 A1* | 1/2015 | Mankowski | G06F 3/04815 |
| | | | 715/848 |
| 2015/0332511 A1* | 11/2015 | Jovanovic | G06T 15/20 |
| | | | 345/427 |
| 2016/0027215 A1 | 1/2016 | Burns et al. | |
| 2017/0323488 A1* | 11/2017 | Mott | G06T 19/006 |
| 2018/0335925 A1* | 11/2018 | Hsiao | G06F 3/011 |

FOREIGN PATENT DOCUMENTS

| | | |
|---|---|---|
| WO | WO 2001/080098 A2 | 10/2001 |
| WO | 2011132373 | 10/2011 |

OTHER PUBLICATIONS

Akenine-Moller, Thomas and Eric Haines. "Real-time rendering." 2nd ed. (2002), pp. 25-34. (Year: 2002).*

International Search Report, PCT/US17/18014, dated May 10, 2017, 2 Pages.

Written Opinion, PCT/US17/18014, dated May 10, 2017, 4 Pages.

Kim et al., "Physics based interaction with Virtual Objects" 2015 IEEE International Conf. On Robotics and Automation, Apr. 2015, 6 pages.

Saba et al., "Dante Vision: In-Air and Touch Gesture Sensing for Natural Surface Interaction with Combined Depth and Thermal Cameras," Emerging Signal Processing Applications (ESPA), 2012 IEEE International Conference, Jan. 12, 2012, pp. 167-170.

Seung-Hwan et al., "3D-Position Estimation for Hand Gesture Interface Using a Single Camera" Human-Computer Interaction. Interaction Techniques and Environments 14th International Conference, HCI International 2011, Orlando, FL, USA, Jul. 9-14, 2011, Proceedings, Part II, pp. 231-237.

Koh et al., "Vision-Based Virtual Touch Screen Interface," Consumer Electronics, 2008, ICCE 2008, Digest of Technical Papers, International Conference on, IEEE, Piscataway, NJ, Jan. 9, 2008, 2 pages.

* cited by examiner

APPARATUSES, METHODS AND SYSTEMS FOR TETHERING 3-D VIRTUAL ELEMENTS TO DIGITAL CONTENT

CROSS-REFERENCE TO RELATED APPLICATIONS

This application claims the benefit under 35 U.S.C. § 119(e) of U.S. Provisional Application No. 62/295,471, titled "APPARATUSES, METHODS AND SYSTEMS FOR 3-D VIRTUAL ELEMENTS EMBEDDED IN CONTENT" filed on Feb. 15, 2016 in the U.S. Patent and Trademark Office, which is herein expressly incorporated by reference in its entirety for all purposes.

BACKGROUND

The interest in wearable technology has grown considerably over the last decade. For example, augmented reality (AR) displays may be worn by a user to present the user with a synthetic image overlaying a direct view of the environment. In addition, wearable virtual reality (VR) displays present virtual images to the user to provide a virtual environment. Both AR and VR displays present virtual digital content. One example of virtual digital content is a three-dimensional (3-D) virtual element. An VR or an AR display system allows a user to interact with the virtual element. For example, a user may can select, move, translate, rotate, stretch, compress, deform, or otherwise interact with a virtual element.

Although AR and VR display systems are growing in popularity, the vast majority of users still consume digital content using consumer electronics or devices with two dimensional displays that are not able to present immersive 3-D virtual elements. Therefore, a problem exists of how to distribute and allow users to consume 3-D virtual elements in digital content without regard to the hardware or system the user ultimately uses to consume the digital content.

SUMMARY

Aspects of the disclosed apparatuses, methods, and systems describe various methods, system, components, and techniques provide tethering 3-D virtual elements in digital content, extracting those 3-D virtual elements, and allowing for a user to manipulate the extracted 3-D virtual elements in a virtual 3-D space.

In some general aspects, the apparatuses, methods, systems, components and techniques described herein provide access to digital content including 3-D virtual elements regardless of whether any particular display system may access, locate, or otherwise render 3-D virtual elements. For example, in some implementations, a display system renders the digital content. While rendering the digital content, a determination is made whether a virtual element is available for the system. If available, the system may locate and render a model of the virtual element tethered in the content. In one example, an augmented reality display system may initially render a low fidelity model of the virtual element. In one example, the low fidelity model of the virtual element may be tethered to the digital content in which the virtual element is included. In this example, untethering of the low fidelity model from the digital content may server as a trigger to download and render the high fidelity model of the virtual element. The rendered low or high fidelity model of the virtual element is capable of user interaction within a virtual 3-D space. In some implementations, once the virtual element is untethered from its associated digital content, the virtual element may be manipulated, moved, changed, and saved (either as a low or high fidelity virtual element) within the 3-D virtual space.

The details of various embodiments are set forth in the accompanying drawings and the description below. Other features and advantages will be apparent from the following description, the drawings, and the claims.

BRIEF DESCRIPTION OF THE DRAWINGS

The following description illustrates aspects of embodiments of the disclosed apparatuses, methods and systems in more detail, by way of examples, which are intended to be non-limiting and illustrative with reference to the accompanying drawings, in which.

DETAILED DESCRIPTION

Figure 1:
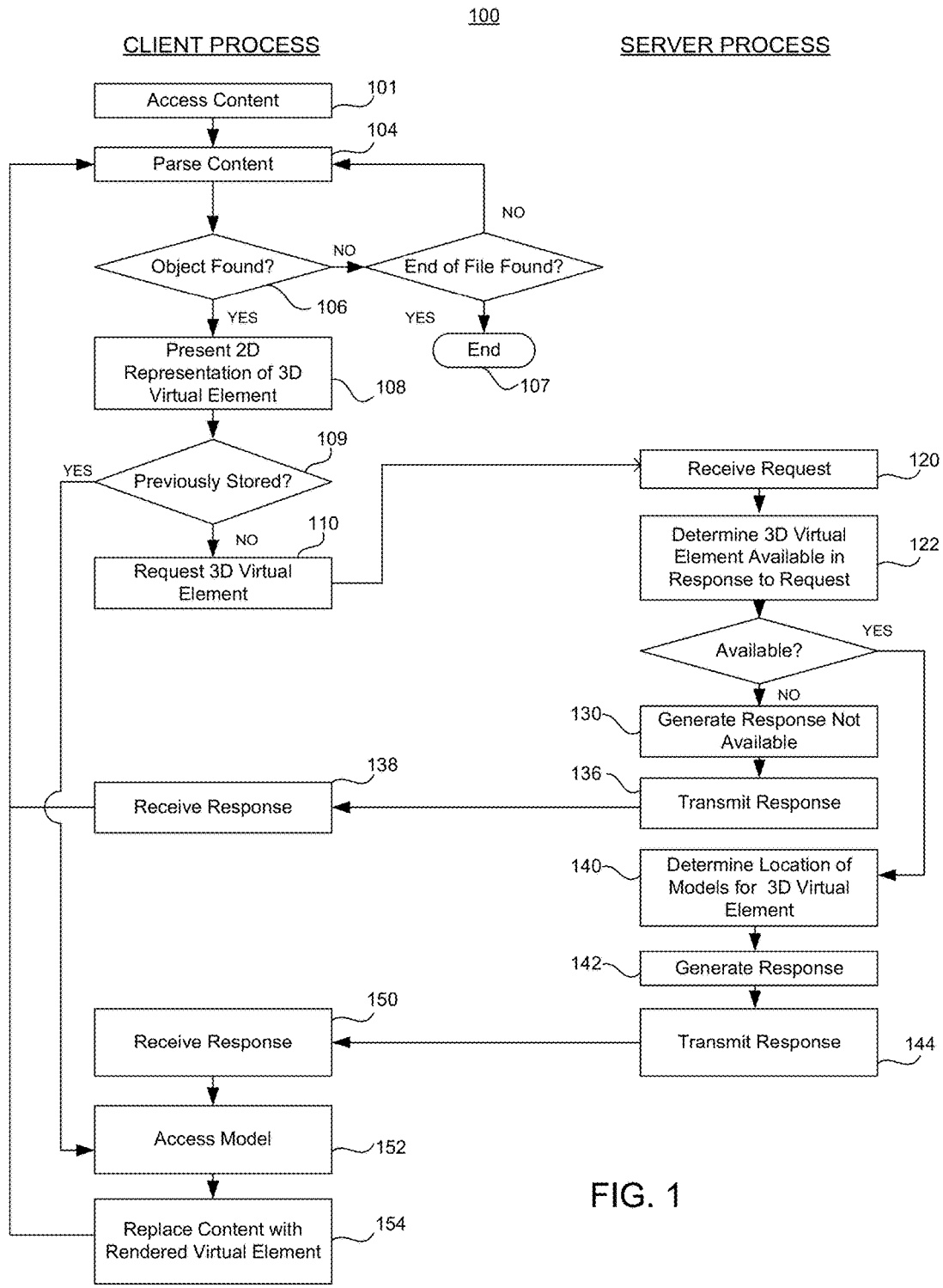
FIGS. 1 and 2 illustrate examples of processes for tethered three-dimensional (3-D) virtual elements.

The following detailed description is merely exemplary in nature and is not intended to limit the described embodiments (examples, options, etc.) or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable making or using the embodiments of the disclosure and are not intended to limit the scope of the disclosure. For purposes of the description herein, the terms "upper," "lower," "left," "rear," "right," "front," "vertical," "horizontal," and similar terms or derivatives thereof shall relate to the examples as oriented in the drawings and do not necessarily reflect real-world orientations unless specifically indicated. Furthermore, there is no intention to be bound by any expressed or implied theory presented in the following detailed description. It is also to be understood that the specific devices, arrangements, configurations, and processes illustrated in the attached drawings, and described in the following specification, are exemplary embodiments (examples), aspects and/or concepts. Hence, specific dimensions and other physical characteristics relating to the embodiments disclosed herein are not to be considered as limiting, except in the context of any claims which expressly states otherwise. It is understood that "at least one" is equivalent to "a."

The aspects (examples, alterations, modifications, options, variations, embodiments and any equivalent thereof) are described with reference to the drawings; it should be understood that the descriptions herein show by way of illustration various embodiments in which claimed inventions may be practiced and are not exhaustive or exclusive. They are presented only to assist in understanding and teach the claimed principles. It should be understood that they are not necessarily representative of all claimed inventions. As such, certain aspects of the disclosure have not been discussed herein. That alternate embodiments may not have been presented for a specific portion of the invention or that further alternate embodiments that are not described may be available for a portion is not to be considered a disclaimer of those alternate embodiments. It will be appreciated that many of those embodiments not described incorporate the same principles of the invention and others that are equivalent. Thus, it is to be understood that other embodiments may be utilized and functional, logical, organizational, structural and/or topological modifications may be made without departing from the scope and/or spirit of the disclosure.

Overview

The following description provides apparatuses, methods, systems, components and techniques for tethering 3-D virtual elements in digital content, extracting those 3-D virtual elements, and allowing for a user to manipulate the extracted 3-D virtual elements in a virtual 3-D space.

The human perceptual system has the ability to combine various sensory cues in an efficient manner in order to perceive physically plausible virtual content in real-world space. For example, the human perceptual system has the ability to integrate, among other things, sensory cues such as one or more of luminance, depth, and/or shape information to form or perceive coherent virtual content in the real-world. As a result, the properties of the human perception may be exploited through visual systems employing hardware and/or software architectures to form virtual content that may be perceived to be located in real-world space by virtue of the principles of the depth sensitive modules of the human brain. The views of virtual content, in addition to the views of the real-world within a user's field-of-view, may define the augmented reality environment.

In some general aspects, an augmented reality display system incorporates transparent optics that have the capability of relaying projected images to the viewer while allowing the viewer also to see his or her real world environment. These systems create a virtual 3-D space based on, for example, input translated from real-world 3-D point data observed by one or more sensors sensor of the display system to overlay the virtual 3-D space over the mapped real world environment of the viewer.

In some implementations, simulated manipulation of virtual content in an augmented reality environment may be based on user input and/or other input. For example, user input may comprise gesture-based input and/or other input. In some implementations, gesture-based input is based on tracking of one or more human features of a user. For example, gesture-based input may be based on tracking one or more of a hand, an arm, a torso, and/or other features of a user. By tracking one or more hands of a user, gestures including one or more of reaching, grabbing, releasing, touching, swiping, pointing, poking and/or other gestures may be identified. The identified gestures may be provided as input for simulating manipulation of virtual content within a user's field-of-view. For example, an identified gesture may be correlated to a perceived position of a virtual element within a user's field-of-view. The virtual element may be configured to react to the gesture in an interactive manner. In another implementation, a discrete gesture may be used. For example, a set of specific discrete hand positions may be used to tell the system to place all tethered 3D objects to the 3-D space. Or when a virtual element is in focus (through the use of gaze of some other selection process) a recognized discrete gesture could trigger the manipulation of the active virtual element. One example, of a discrete gesture may be the user's hand palm facing the virtual element, fingers in a ball except for the index finger pointing up.

In another example, user input associated may be determined when at least one sensor of the display system determines that the translated position of a real-world object, such as a hand or finger, into the 3-D virtual space enters an interactive boundary of a virtual element. In this example, the display system determines the force exerted on the virtual element by the translated real-world object according to a certain parameters associated with the interactive boundary of the virtual element. The virtual element responds to the exerted force based on the properties assigned to the virtual element and based on the properties of the virtual environment in which the virtual element and translated real-world object are present.

In some embodiments, virtual content may consist of one or more virtual elements. In one example, a virtual element may be any shape rendered as a digital image by at least one light source of the display, such as a display, a projector or other imaging component capable of generating a visible image of the shape within a virtual 3-D space. Each virtual element may have associated content and a number of assigned parameters to model the properties of the virtual element within a virtual 3-D interactive space. The parameters are processed to determine the behavior of the object in the virtual 3-D space. In one example, the virtual element is a 3-D model including at least one file specifying a geometry of the object. For example, the file may include vertex data, free-form curve/surface attributes, objects, free-form curve/surface body statements, connectivity between free-form surfaces, grouping and display/render attribute information. Examples of objects include geometric vertices, texture coordinates, vertex normals, and polygonal faces. In one example, an .OBJ file may be used or other similar format, such as .STL and .PLY. The file may include or reference additional elements and/or metadata used by the display system to create the virtual element in the virtual 3-D space. For example, additional files or libraries may be referenced to describe surface shading (i.e., material) properties of objects, such as .MTL files (called "material libraries"), for example. Primitives and charges also may be mapped to or associated with the geometry for manipulation of the virtual element using a physics model. Other objects and/or metadata also may be associated with or stored by the file including, callouts, exploding views, animations, a visual and an auditory feedback, and the like. For example, call outs may be attached to a vertex ID like a note with layout performed using a graph layout algorithm. Audio may be localized in 3-D to an object, using for example, multiple speakers positioned relative to a user to provide 3-D binaural rendered audio perceived as emanating from a position in space. For example, based on an object's location in 3-D virtual space and the relative position of a viewer (e.g., calculated using a head-related transfer function), sound is binaurally rendered as emanating from the location of the virtual element in space.

The apparatuses, methods, systems, components and techniques provide access to digital content including 3-D virtual elements regardless of whether any particular display system may access, locate, or otherwise render 3-D virtual elements. For example, in some implementations, a display system renders the digital content. While rendering the digital content, a determination is made whether a virtual element is available for the system. If available, the system may locate and render a model of the virtual element tethered in the content. In one example, an augmented reality display system may initially render a low fidelity model of the virtual element. In one example, the low fidelity model of the virtual element may be tethered to the digital content in which the virtual element is included. In this example, untethering of the low fidelity model from the digital content may server as a trigger to download and render the high fidelity model of the virtual element. The rendered low or high fidelity model of the virtual element is capable of user interaction within a virtual 3-D space. In some implementations, once the virtual element is untethered from its associated digital content, the virtual element may be manipulated, moved, changed, and saved (either as a low or high fidelity virtual element) within the 3-D virtual space.

System Processes

FIG. 1 illustrates an example of processing 3-D virtual elements associated with digital content. FIG. 1 shows one example 100 of operations in a process implemented by a client system and a server system to provide 3-D virtual elements tethered in digital content. In this example, a client system includes one or more processing devices, storage devices, communication interfaces, and at least one associated display or projector, examples of which are provided in further detail below. Another example of a client system is an augmented reality client system capable of presenting and manipulating virtual elements. In this example, the augmented reality client system also includes a stereoscopic display system comprising one or more displays or projectors, optical elements for reflecting light from the one or more displays or projectors, sensors, communication interfaces, and associated processing devices, and the like. The server system may include one or more communication interfaces, processing devices, storage devices, and the like.

As shown in the exemplary process 100 of FIG. 1, in operation 101, the client system accesses digital content. The digital content may be stored as a computer file. A computer file is a computer resource for recording data discretely in a storage device. One skilled in the art appreciates there are many different types of computer files for storing and organizing different types of data. For example, a computer file may be designed to store images, text, videos, a programs and software, in addition to a wide variety of other kinds of information, including multiple types of information. In some examples, the computer file may include multiple data elements. In some implementations, a 3-D virtual element may be tethered as a data object within the computer file. The computer file storing the digital content may be accessed and processed by a processing device of the client system to present the digital content to a user using a display device. For example, the digital file may be a document, a spreadsheet, a table, a webpage, and the like, or a portion thereof, including various data objects that may be processed and presented to a user, using a program or application, such as a word processor, productivity software, a browser, or any other type of data processing application.

By way of non-limiting illustration, the digital content in one implementation is a Hyper Text Markup Language (HTML) document. However, one skilled in the art will appreciate that the implementation described below may be applied to other types of digital content consistent with the descriptions herein. In addition to HTML documents, 3-D virtual elements can also be tethered in more closed documents, such as a word processing document or spreadsheet.

In these examples, a document specific 3-D object is placed in the digital content. In this example, the client system installs a plugin to allow the client system to query and received information regarding the type of content currently being presented by the system corresponding to a page being rendered its position relative to other elements. The plugin in conjunction with the 3-D virtual element tethered within the document allows the system to render the tethered virtual element and track its position relative to the parent element contained within the document.

An HTML document includes a plurality of HTML elements. For example, an HTML element is an individual component of an HTML document or web page that is parsed by a browser or other similar type of application into the Document Object Model (DOM) to render or otherwise present the content of the HTML document. In general, HTML is composed of a tree of HTML elements and other nodes, such as text nodes. Each element can have HTML attributes specified. Elements can also have content, including other elements and text. In one embodiment, an HTML element is used to embed or tether a virtual element within the document.

In HTML syntax, most elements are written with a start tag and an end tag, with content inserted between the tags. An HTML tag is composed of the name of the element, surrounded by angle brackets. In one embodiment, an image tag (e.g., an IMG tag) may be used to tether a virtual element within the document. The following HTML data element is one example of an HTML IMG tag that may be used to tether virtual elements: <img data-meta-hologram="GUID" src="smartwatch1.gif" alt="Smart Watch" height="42" width="42">.

The "IMG" HTML tag is used to display a thumbnail image associated with the virtual element and trigger a process for the discreet loading of digital content associated with the virtual element when a client system supports viewing of 3-D virtual elements (e.g., when the client system includes a stereoscopic display or projection system or other components capable of rendering virtual images in a 3-D space). In this example, the thumbnail is a 2D image that may be rendered by a browser regardless of the type client system employed to view the content. The data attribute "data-meta-hologram" of the HTML IMG tag includes a "globally unique identifier" (e.g., GUID) that may be used by an application programming interface (API) call to gain access to the associated virtual element. For example, the GUID may be a string encoded address, such as aee97cb3ad288ef0add6c6b5b5fae48a, that is used by an API call to identify and retrieve the corresponding virtual element from a server system.

The source "SRC" points to a location of an image or thumbnail via fully realized URL address. In one example, the thumbnail is available to all to all client systems regardless of the hardware platform used to present and view the web page. Additional attributes also may be provided, such as height and width. The HEIGHT attribute is used to define height of the image thumbnail and the tethering and/or positioning of a low fidelity 3-D virtual element in relation to the rendered presentation of the document. Similarly, the WIDTH attribute is used to define width of the image thumbnail and the tethering and/or positioning of the low fidelity 3-D virtual element in relation to the rendered presentation of the document.

Although, an IMG tag is described herein as a source of tethering a virtual element to HTML content, such as a web page, one skilled in the art will appreciate that other HTML elements can be provided with customized attributes to tether a 3-D virtual element, such as, for example, a HTML Document Division Element (DIV), a HTML header element (H1), an HTML <a> href Attribute, a HTML table element, and the like to name but a few.

In operation 104, the client system parses or processes the accessed digital content according to the application accessing the digital content. For example, the system may implement a web browser application, which renders the HTML elements of the document for presentation to a user.

In operation 106, the client system determines whether a virtual element is located in the digital content of the file. For example, as the system parses the elements of an HTML document for rendering on a display or for projection by a light source, the system determines whether any HTML element corresponds to a virtual element. For example, the system determines whether the document includes one or more data elements with a custom data attribute, such as, "data-meta-hologram." If no virtual element is located, in operation 107 the system determines whether the end of the computer file or document is reached. If the end is reached the process 100 ends. If the end is not reached, system continues to parse elements of computer file or document in operation 104 as the document is rendered until a virtual element is found in operation 106.

Figure 3:
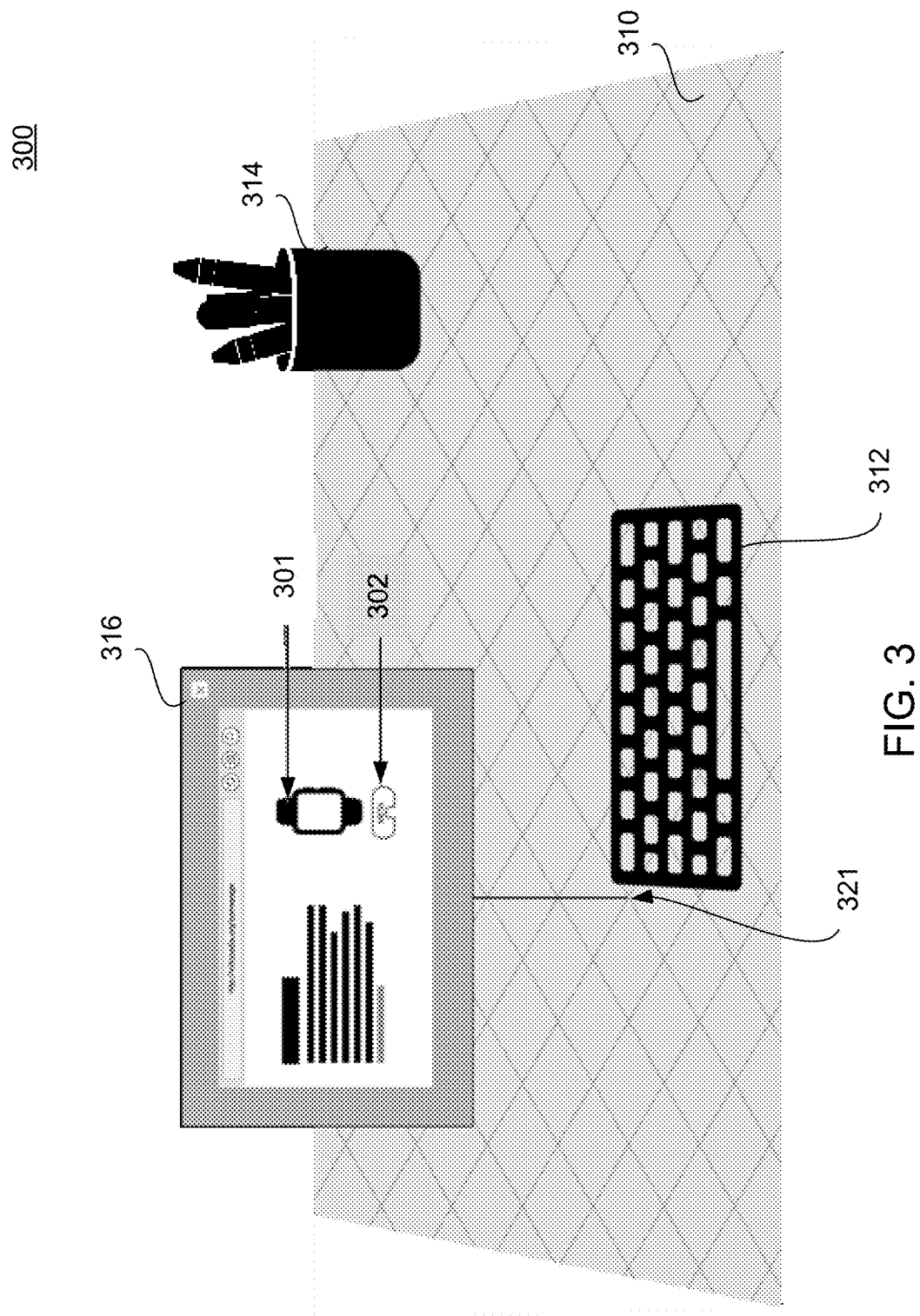
FIG. 3 illustrates an example of a representation of a 3-D space overlaying a real environment including a visual representation associated with a tethered 3-D virtual element.
Figure 4:
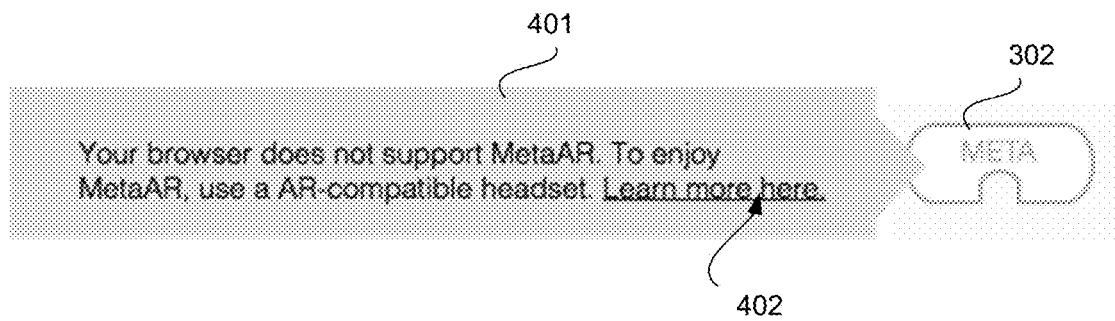
FIG. 4 illustrates an example of an input and message associated with the presentation of a visual representation associated with a tethered 3-D virtual element.

If a virtual element is located in the digital content, in operation 108, the client system initially presents a 2D representation associated with the 3-D virtual element. For example, as the browser renders the HTML document, the browser may access and insert a specified image thumbnail (e.g., smartwatch1.gif)—or alternative text (e.g., "Smart Watch") if a thumbnail is not available—according to the height and width dimensions provided (e.g., 42×42). While a hardware or a software requirement, such as a setting (e.g., an access setting, such as private, public, or user specific), can constrain access to and interaction with a virtual element, all users may be shown the thumbnail image. For example, as shown in FIG. 3, while the IMG tag is parsed, a 2-D thumbnail image 301 is rendered for all users, regardless of system requirements or permissions for the 3-D virtual elements. In addition, in one example, a small button 302 indicating that the image 301 has an associated virtual element may be presented. For example, the button may respond to a user input in conjunction with the browser interface, such as, for example, a hover-over-the-button input, to display a message and a hyperlink. FIG. 4 shows one example of a notification message that may be presented to a user if the hover over the button input is detected. For example, the message with hyperlink "Your browser does not support MetaAR. To enjoy MetaAR, use an AR-compatible headset. Learn more here", may be presented. The notification message in FIG. 4 is an example of a message that could be displayed to a user to indicate that the system being used by the user does not have the necessary hardware or software components to display the 3-D virtual element in an augmented reality environment.

In operation 109, the client system determines whether the virtual element has previously been stored in a storage device of the client system. For example, the client system can search a directory of a memory location including a cache, a temp file folder, and/or a downloaded file folder, or other storage location and the like of a storage device accessible by the client system to determine whether a file corresponding to the virtual element is stored locally at or is accessible by the client system. In some implementations, if a previously stored location copy is found, the process may proceed to operation 152 to access the model from the stored location.

In operation 110, the client system requests the 3-D virtual element. For example, whenever the HTML parser of the client system parses an IMG tag with a virtual element data attribute (e.g., a data-meta-hologram attribute) a discrete process is triggered. In some implementations, the client system captures the GUID from the data attribute of the html element used to tether the virtual element in the HTML document. The client system generates a message, such as an API call (e.g., a get call) to a corresponding server system storing the digital content associated with the virtual element and/or a location at which the virtual element may be accessed by the client system. The message encodes the GUID in a format compatible with establishing and executing a communications path between the client system and the server system. Additional information also may be encoded in the message, such as, for example, one or more of a unique user identifier, a user agent, information from a cookie, and system components, or compatibility information.

In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose, the Internet Protocol (IP) defines addressing methods and structures for datagram encapsulation. Of course, other protocols also may be used. Examples of an Internet protocol include Internet Protocol Version 4 (IPv4) and Internet Protocol Version 6 (IPv6).

In operation 120, the server system receives the request from the client system. For example, a message including the API call addressed to the server system is received by a communications interface and is stored in a buffer, queue, or the like for processing by a processing device of the server system.

In operation 122, the server system determines whether a 3-D virtual element is available corresponding to the request from the client system. For example, the server system parses the message to determine and process the message content. In one example, the server system processes the GUID to determine whether the system can identify a virtual element that matches the requested GUID. If a match is found, the system determines whether there are any restrictions or constraints of access regarding the virtual element. For example, the virtual element may include a share setting, such as public, private, or user specific. If the share setting is private or user specific, the system uses an identification associated with the client device (e.g., the unique user ID) to look up whether the user has the appropriate credentials or level of access. In addition, the system may determine if the client system has the requisite components (e.g., hardware, software, and the like) provided with the request to render and/or interact with the virtual element.

If no element is available (e.g., because of lack of content, permission, incompatibility, or the like), in operation 130, the server system generates a response to the client system. For example, the server system may generate an encoded message addressed to the client system. The message may indicate to the client system and/or user of the client system why a virtual element is not available. In one example, the message may include an error code indicating why a virtual element is not available. In operation 136, the server transmits the response to the client system. In operation 138, the client system receives the response. The client system may store or otherwise processes the response (e.g., for debugging or error resolution), and client system continues to parse elements of the document 104 as the document is rendered until a virtual element is found 106 or the end of the document is reached 107.

If the server system determines the virtual element is available, in operation 140 the server system determines a location of a low-fidelity and a high-fidelity model corresponding to the 3-D virtual element. In operation 142, the server system generates a response to the client system that presents the locations in a message addressed to the client system. In operation 144, the server system transmits the response to the client system. For example, the server system encodes data packets with the locations addressed to the client server, and then transmits the packets to the client device over the communications path in response to the API call.

In operation 150, the client system receives the response of from the server system. In operation 152, the client system accesses the data file corresponding to the virtual element (e.g., the high or low-fidelity virtual element) from a storage device of the client system (e.g., a cache, a buffer, a local memory and the like) and then renders the virtual element in operation 154 (e.g., through the use of a graphics rendering engine). Rendering here is specified as the following implementation. System reads the 3-D model native data file and captures model data which includes vertices, normals, mesh groups and material data. Next the system creates the meshes in the 3-D space using a 3-D engine, from the data read in. Lastly various application-specific functionality such as bounding volume are integrated to make the virtual element interactive. In one implementation, the low-fidelity virtual element is accessed in operation 152 from the location specified in the response from the server system. For example, the client system may a make request to a URL or other address specified in the response from the server system to download the data. For example, the client may make a request or establish communications with a server from which the low-fidelity virtual element may be downloaded. In one example, this server system may be the same or a different that the server system to which the API call was made. In this example, once data file for the low-fidelity virtual element is downloaded, in operation 154 the client system replaces the image thumbnail by rendering a model of the low-fidelity virtual element associated with the content presented by the client system to the user.

In some implementations, the client system tethers the low-fidelity virtual element to the rendered version of the digital content at a position corresponding to the tethered location of the virtual element within the digital content (e.g., corresponding to the location with a 2-D image corresponding to the tethered virtual element is rendered). For example, the client system may render a low-fidelity virtual element in a position relative to placement of the HTML element, such as the IMG tag, within the rendered webpage. In this example, once the low-fidelity virtual element is downloaded, the client system may use the HTML element height and width attributes and/or other attributes (e.g., attributes of the low-fidelity virtual element and the perceived location of the HTML document by the user as rendered within the virtual space) to determine a depth or other volumetric dimension associated with rendering the low-fidelity model of the virtual element. In one example, the combined height, width, and depth are used to define a volume and location within the virtual 3-D space in which the low-fidelity virtual element is rendered, such as, for example, a bounding volume (501) as shown in FIG. 5.

Figure 5:
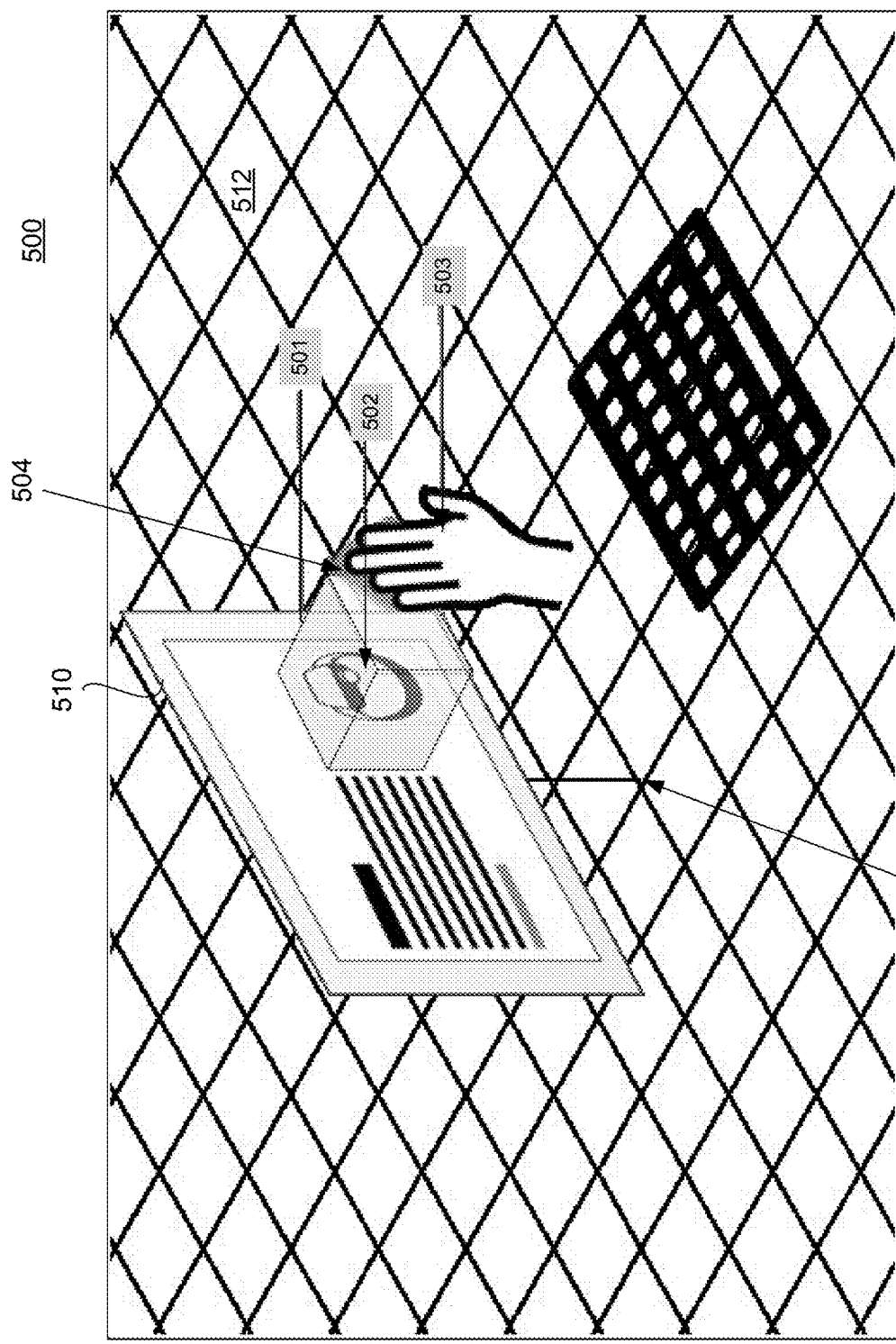
FIG. 5 illustrates an example of a representation of a 3-D workspace including a representation of low fidelity virtual element tethered to content.

As shown in FIG. 5, the bounding volume 501 is a rectangular box. In one example, the volume is tethered to the rendered HTML document within the 3-D space. For example, the bounding volume defined by the box is positioned spatially adjacent to the rendered view of the HTML content at a location corresponding to the location at which the thumbnail image was rendered. In some examples, the bounding volume is anchored or tethered to the rendering of the content at the determined position so that, for example, as the document manipulates or otherwise moves the corresponding digital content, the rendering of the low-fidelity virtual element appears to move in conjunction with the manipulation or movement. For example, the low-fidelity virtual element appears move with the corresponding location within the rendered HTML content as the content is scrolled. If the manipulation or movement of the content causes the position associated with the location of the tethered low-fidelity virtual element to cease being rendered by the client device, the low-fidelity virtual element also ceases to be rendered. For example, when the position of the rendered HTML content associated with the tethered location of the virtual element is moved outside of the view of the window of the browser displaying the content, rendering of the low-fidelity virtual element ceases until the position within the HTML document is once again rendered within a window of the browser. In addition, the bounding volume also provides constraints in which a user can manipulate and transform the low-fidelity virtual element. For example, the volume defines a position within the 3-D virtual space in which a user may interact with the low-fidelity virtual element, for example, rotating, scaling, or otherwise moving the element within the volume.

In one example, rendering a low-fidelity virtual element provides a seamless user experience by leveraging the height and width attributes of the parent IMG tag to maintain the design integrity of the HTML content, while providing users with an additional layer of exploration of the low-fidelity virtual element before requesting the high-fidelity virtual element, for example, which may incur a higher data cost, expense, processing power, and storage constraints and the like.

Figure 2:
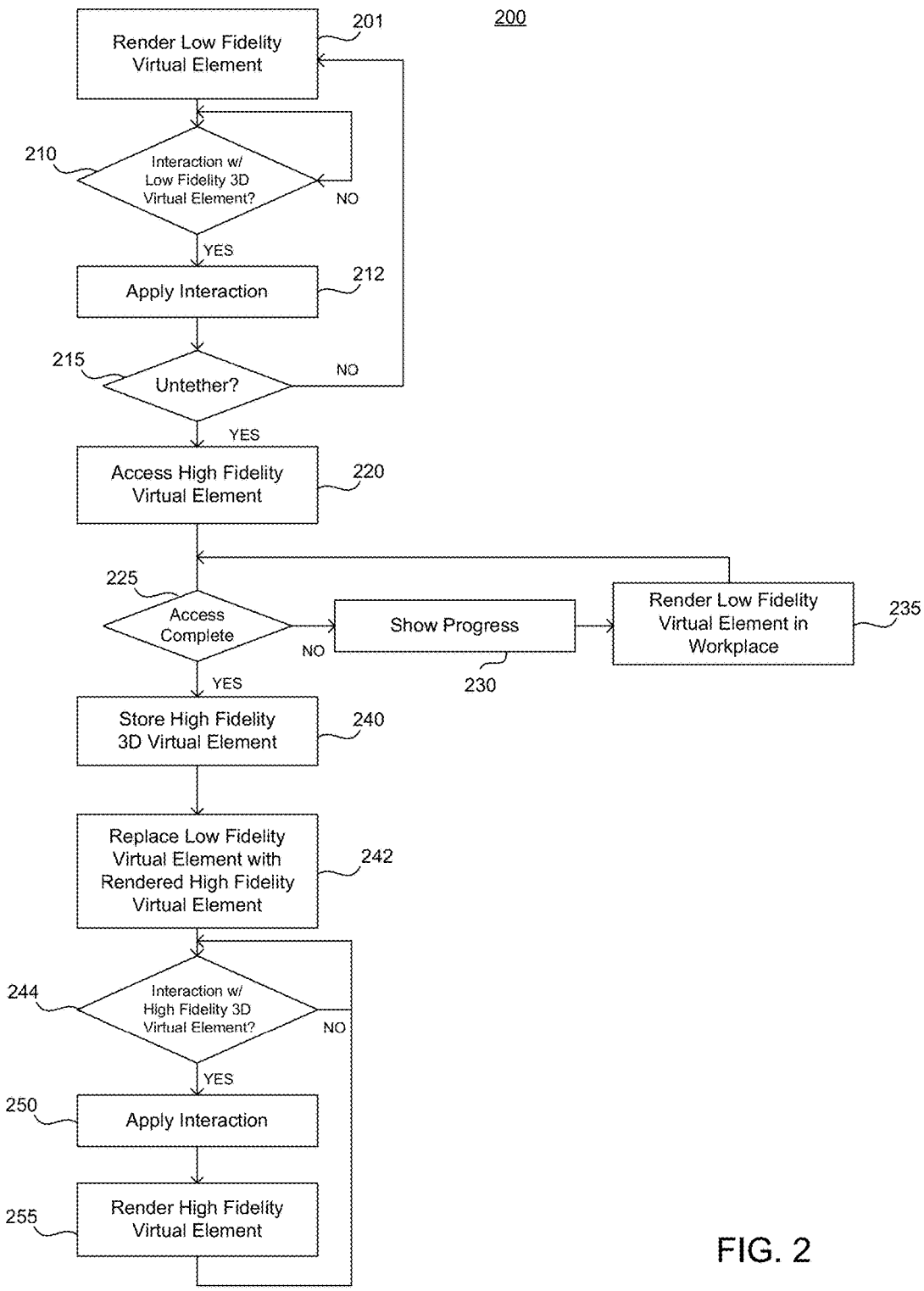

FIG. 2 shows an example 200 of a process for rendering the low-fidelity virtual element and subsequent replacement of that element with a high-fidelity virtual element in a 3-D virtual space.

As shown in the exemplary process of FIG. 2, in operation 201, the client system renders the low fidelity virtual element in a bounding volume tethered or anchored to a corresponding position of the rendered digital content in which the virtual element is tethered. The client system determines the bounding volume, such as a bounding box in which the low fidelity virtual element is rendered. The bounding volume specifies a position within the virtual 3-D space at any instant in time in which the low-fidelity virtual element resides. For example, as described above, the client system determines a position of the bounding volume relative to a position of the rendered digital content, such as the rendered HTML document within a browser window. The client system renders the low-fidelity virtual element within the bounding volume according to the model's attributes and metadata.

In some implementations, the low fidelity object or high fidelity object may be rendered in the bounding volume. In one exemplary process, the rendering may be done in two parts. For example, the first part of the process provides the rendering mechanism with an ideal bounding box (b2) based on environmental constraints, such as current FOV. The second part of the process calculates a bounding box (b1) that does not exceed the size of (b2). The size of the bounding box increases as each part of the model mesh of the virtual element is considered. For example, the X, Y and Z extent of each mesh of the model may be examined and the bounding box (b1) increased if the extents are greater than the current bound. This process continues until all meshes have been examined.

In operation 210, the client system determines whether the user is interacting with the low-fidelity 3-D virtual element. For example, the system determines whether user input corresponding to a real world object interacts with the low-fidelity virtual element. In one embodiment, a user input is detected and modeled in the virtual space as a collection of point charges. For example, a real world element (e.g., a user hand, a user digit, a pointer, or any other real world object that may be detected by at least one sensor of the client system) may be modelled using a point cloud derived from the output of one or more sensing devices. For example, a sensing device senses and/or detects a real world object and outputs a collection of point data representative of the real world object in space referred to as a "point cloud" and its movement in space over time. Examples of sensors include one or more of a camera, a three dimensional scanner, a depth sensor, a rangefinder, a laser gauge, a time-of-flight sensor, a volumetric imaging sensor, an IR camera/emitter pair, a passive, structured, or unstructured light stereo pair, and/or other devices.

The point data from the sensor is translated by the client system into coordinates corresponding to the location of the point data in the virtual 3-D space. In one example, a Time-of-Flight (ToF) camera returns a set of 3-D points with spatial coordinates correlated with real world elements within the camera's range of vision. In this example, each point has a spatial coordinate (x,y,z), the confidence of the data (e.g., a value ranging from 0 to 1), and time stamp associated with a frame or snapshot in time from the sensor. The point cloud may be filtered, for example, using the confidence values to stabilize the input and reduce noise associated with detection of the point cloud. The filtered point cloud is then mapped to 3-D virtual space coordinates to align the virtual world and the real world within the user's field of view.

In some implementations, the filtered collection of points also may be assigned a charge. In one example, different points corresponding to different real world elements may be assigned different charges (e.g., a point cloud associated with a user's hand may have one charge and a table surface may have a same or different charge). In addition, data and/or a unique identification (ID) may be associated with the points. In one example, a visual indication of the points in the cloud may be rendered within the 3-D virtual space (e.g., to aid a user in manipulating real world objects in order to affect virtual elements in the virtual 3-D space). When points within the cloud enter the field or boundary associated with a virtual element (such as an interactive boundary or force field associated with a primitive of the virtual element), forces may be determined and applied to the primitive based on parameters assigned to the primitives and to the virtual environment to determine a response by the associated virtual element. Examples of the systems and method for manipulation of virtual elements are described in detail in U.S. application Ser. No. 15/398,697, titled "APPARATUSES, METHODS AND SYSTEMS FOR APPLICATION OF FORCES WITHIN A 3D VIRTUAL ENVIRONMENT", filed on Jan. 4, 2017, which is hereby incorporated by reference in its entirety for all purposes. For example, in operation 210, the client system determines if a point cloud associated with a real world object has penetrated an interactive boundary associated with the low-fidelity 3-D virtual element.

In some implementations, the filtered collection of points may be processed by the client system to determined user gesture-based input and/or other input. User gesture-based input is based on tracking of one or more human features of a user. For example, gesture-based input may be based on tracking one or more of a hand, an arm, a torso, and/or other features of a user. For example, the collection of points may be processed to determine cluster surfaces and cluster groups within the collection of points. A mapping component of the client system may be configured to associate, for individual cluster groups, individual clusters included in individual cluster groups with individual human features, such as hand features. Individual hand features may include one or more of a wrist, a thumb, a metacarpophalangeal joint of a thumb, a palm, a finger, a metacarpophalangeal joint of a finger, a fingertip, a set of fingers, a set of metacarpophalangeal joints of a set of fingers, a set of finger tips, and/or other hand features. By tracking one or more hands of a user and determining associated features, gestures including one or more of reaching, grabbing, releasing, touching, swiping, pointing, poking and/or other gestures may be identified. The identified gestures may be provided as input for simulating manipulation of the virtual element within the bounding volume within a user's field-of-view. For example, an identified gesture may be correlated to a perceived position of a virtual element within the bound volume and the virtual element may be configured to react to the gesture in an interactive manner. Examples of the systems and methods for identifying human features for gesture based input are described in detail in U.S. application Ser. No. 15/263,318, titled "TRACKING A HUMAN HAND IN AN AUGMENTED REALITY ENVIRONMENT", filed on Sep. 12, 2016, which is hereby incorporated by reference in its entirety for all purposes.

If there no interaction is detected, the client system continues to determine whether there is user interaction with the low-fidelity virtual element 210. If the client system determines there has been user interaction, in operation 212 the client system applies the interaction to the low-fidelity virtual element. For example, if the point cloud associated with a real world object has penetrated an interactive boundary associated with the low-fidelity 3-D virtual element, the system determines a force applied to the low-fidelity virtual element or a user gesture and renders the resulting application of the force or user gestures (e.g., a rotation of the low fidelity virtual element, a grabbing of the low-fidelity virtual element, movement of the low fidelity virtual element in a direction).

In operation 215, the client system determines whether the result of the applied interaction untethers the low-fidelity virtual element from the digital content in which the virtual element is tethered. In one example, the client system determines if the low-fidelity virtual element has been moved outside of the bounding volume. For example, the system may determine if one or more spatial coordinates associated with rendering of the low-fidelity virtual element have changed to coordinates that are located outside of the one or more of the boundaries defined by the bounding volume. In another example, a combination of conditions may be used to determine whether the low-fidelity virtual element is untethered. For example, a type of force or gesture may be determined, such as grabbing of the low-fidelity virtual element, and a condition of whether the low-fidelity virtual element is moved and/or released outside of the bounding volume may be used as a trigger to indicate untethering of the low-fidelity virtual element. If the low-fidelity virtual element remains tethered, in operation 201 the client system renders the response of the low-fidelity virtual element to the interaction based on the model of the low-fidelity object.

If the client system determines that the low-fidelity virtual element is untethered from the content as a result of the interaction, in operation 220, the client system accesses and loads a corresponding high-fidelity virtual element. For example, the client system may request downloading of the content for the high-fidelity virtual element from a server at the location returned by the API call. In another example, the client system may access the high-fidelity virtual element from a local memory if the high-fidelity virtual element is stored in a locally accessible storage device.

In operation 225, the client system determines if access and loading of the high fidelity virtual element is complete. If the download is not complete, in operation 230, the system shows progress of the download and in operation 235, the system continues to render the low-fidelity virtual element in the workspace.

In operation 240, when the download is finished, the client system may store the high-fidelity virtual element in a system library for virtual elements used by the client system.

In operation 242, the client system replaces the low-fidelity virtual element with the rendered high-fidelity virtual element. For example, once the model for the high-fidelity virtual element is downloaded, the client system replaces the low-fidelity virtual element within the user's field of view by rendering a high-fidelity virtual element in place of the low-fidelity virtual element. The high-fidelity virtual element may include a robust 3D model with additional metadata, content, and attributes. For example, a higher resolution image providing more visual detail may be provided. Additional content may be provided such as callouts or interactive elements such as inputs or buttons. Moreover, attribute may specify types of interaction, such as where and object may be grabbed, how an object may be scaled to increase or decrease size, and whether the object may be exploded into different views (e.g., showing component parts of a complex system).

In operation 244, the client system determines whether there is any interaction with the high-fidelity virtual element. Similar to the low-fidelity virtual element, the system determines whether a point cloud associated with a real world object interacts with the high-fidelity virtual element.

In operation 250, the client system applies the interaction to the high-fidelity virtual element in the 3-D virtual space.

In operation 255, the client system renders the result of the interaction of with the high-fidelity virtual element in the in the 3-D virtual space.

In another implementation, the process implemented in FIG. 2 may be abridged when processing power or bandwidth is not a consideration. For example, in some implementations, the client system may not load or render a low fidelity virtual element. Instead, the client system may access and render the high fidelity virtual element or a scaled version thereof in the bounding volume in operation 201 without use of the low-fidelity model of the virtual element. In this case, some manipulation and user interaction with the high fidelity virtual element may be restricted while the high fidelity object is tethered to the digital content within the bounding volume in operations 210 and 212. Once the high fidelity object is untethered in operation 215 the process would proceed directly to operations 244, 250 and 255. This abridged process may be useful in situations where the high fidelity object is stored locally and/or processing power or communication bandwidths are not restricted or a concern in a particular application. Furthermore, the client system may be provided with a toggle option to select between a preferred process.

Virtual and Real World Environments

FIG. 3 illustrates an example of a representation of a 3-D virtual space overlaying a real world environment including a visual representation associated with a tethered 3-D virtual element. As shown in the example of FIG. 3, a user environment 300 as viewed through a stereographic augmented or virtual reality system by the user includes both real world objects and virtual elements. For example, the environment 300 includes real world elements, such as a tabletop 310, a keyboard 312, and a pencil holder 314, and a virtual element, such as a virtual frame 316.

In one example, one or more sensors (e.g., a depth camera, one or more monochrome cameras, an RGB camera, and the like) of the stereographic optical system of the client system generate spatial information to detect and map the location of real world elements relative to the optical system. The spatial information is also used to locate and/or map the virtual 3-D spatial coordinates in relation to the real world elements. In some implementations, various sensors of a client system may be configured to sense and map features of the user's real world environment. For example, sensors may include one or more depth sensors, monochrome cameras, and/or and inertial measurement units. One or more mono cameras may be used to capture images depicting corners, texture patterns, high frequency textures, lines, sharp edges or other similar entities that can be tracked via computer vision algorithms. Examples of features include Harris corners, Sobel edges, Canny edges, KLT features/Good Features To Track, Features from accelerated segment test (FAST) features, (Oriented FAST and Rotated BRIEF) ORB, Simultaneous localization and mapping (SLAM), BRISK, SURF features and the like. The detected features are processed by computer vision algorithms of various applications to sense and map the user's real world environment. For example, information obtained from one or more mono cameras is used for pose estimation using techniques, such as Visual-Inertial Odometry/Navigations, SLAM, Visual-Inertial SLAM, and the like.

In addition, a depth image sensor that senses the distance of an object/scene within the real world environment of the user also may be used to gather information about the user's environment. In one example, a depth sensor may be implemented using a Time-of-Flight (TOF) camera. In one example, the TOF camera emits a pre-defined pattern, and the depth of the scene images captured by the camera are algorithmically converted to a depth image where each pixel contains the depth of the scene (e.g., structured light depth sensing). The output depth images from the depth camera are used for Hand Tracking and Environment Sensing. In addition, the output may be used for Semantic Recognition and Pose Estimation. The output from the depth sensor also may be used as an input for Hand Sensing. For example, the depth sensor provides depth values that allow motion of hands and their interaction with digital content to be determined. In addition, the output from the depth sensor is used as an input for Environment Sensing. For example, the depth sensor provides a representation of the user's environment to form of point clouds of data points, a depth map of environment features, and/or three-dimensional (3D) meshes of the environment of the user. Furthermore, the depth sensor also can assist other processes, such as Semantic Recognition by sensing information about the shapes of objects and scenes used to differentiating characteristics of the object or the scene. Finally, the Depth Sensor can provide additional data as input to Pose Estimation resulting in determinations that are more robust. For example, the depth data allows the implementation of RGBD SLAM algorithms that combine RGB data with depth information, depth-based SLAM algorithms (such as Kinect Fusion), and also can aid estimation of a scale factor of the trajectory of a monocular Slam and/or Visual Inertial Navigation system. The visual algorithms are used to build a 3-D coordinate map of the user's environment over which a 3-D virtual space is overlaid.

In the example shown in FIG. 3, a virtual frame 316 may be rendered in the virtual 3-D space. In one example, the virtual frame is a high-fidelity virtual element. The virtual frame 316 may be used to display virtual digital content. As shown in the example illustrated in FIG. 3, the virtual frame 316 may be rendered at coordinates within the 3-D virtual space according to a 3-D map of the virtual space determined from the input of the various sensors described above. In some examples, these coordinates may be anchored to a coordinate 321 associated with a real world object (e.g., the table top 310) located in the user's real-world environment that is mapped by the system. The virtual frame 316 may present digital content from a computer file, such as a document or a webpage including a thumbnail image 301 associated with a virtual element and a user button 302, as described above. For example, as shown in FIG. 3, while the IMG tag is parsed by the client system, a 2-D thumbnail image 301 is rendered. In addition, the button 302 is rendered indicating that the image 301 has an associated virtual element that may be presented.

FIG. 4 illustrates an example of an input and a message associated with the presentation of a visual representation associated with a tethered 3-D virtual element. For example, a depiction of a button 302 is shown. User interaction with the button, such as, for example, a hover over the button input, causes rendering of a message 401 and a hyperlink 402. FIG. 4 shows one example of a notification message 401 that may be presented to a user if the hover over the button input is detected. For example, the message "Your browser does not support MetaAR. To enjoy MetaAR, us an AR-compatible headset. Learn more here.", may be presented. As noted above, the notification message in FIG. 4 is an example of a message that may be displayed to a user to indicate that the client system used to render the digital content does not have the necessary hardware and/or software components to display the 3-D virtual element in an augmented reality environment.

FIG. 5 illustrates an example 500 of a representation of a user environment as viewed by a user of the stereoscopic augmented reality display system. As shown in FIG. 5, a 3-D virtual space includes a representation of low-fidelity virtual element tethered to digital content. In the example shown in FIG. 5, the client system renders a virtual frame 510 anchored virtual map coordinates 511 in a virtual 3-D space corresponding to a table top 512. The virtual frame presents digital content, such as, for example, a document or a webpage. In one example, a browser of the client system accesses the digital content (e.g., web content) from a publisher and renders the content as mapped and rendered in the virtual frame according to the specified spatial coordinates of the frame in the virtual 3-D space.

In addition, a low-fidelity virtual element 502 is tethered to the rendering of the webpage within the virtual frame. In this example, the low fidelity virtual element is anchored to a position within the HTML document corresponding to the rendered position of a corresponding HTML tag. As the position in the HTML document to which the low-fidelity virtual element is anchored is rendered within the virtual frame, the low-fidelity virtual element is rendered at the same time so that the two are simultaneous in view. In one example, the low-fidelity virtual element is rendered within the virtual space of a bounding volume 501 at a defined proximity to the virtual frame. In one example, the bounding volume is a rectangular box whose position is based on the rendered portion of the document to which the low-fidelity virtual element is anchored. For example, the client system renders the low-fidelity virtual element within the bounding volume positioned adjacent to the frame. It will be appreciated that the dotted lines showing the dimensions of the bounding volume are for aid of illustration and are not necessarily rendered by the system or visible to the user; however, in some implementations a visual effect (e.g., an outline, highlighting and/or shading) may be rendered in conjunction with the bounding volume in order to allow a user to be aware of the volume. This may be useful when introducing the bounding volume to new users of this feature. In addition, the client system may be provided with an input to toggle this effect on or off. The size of the bounding volume may be determined from the HTML element in which the virtual element is tethered and attributes of the low-fidelity virtual element. In one example, the attributes and content of the low-fidelity virtual element may be sized and/or scaled to fit within the bounding volume 501.

In one example, dimensions associated with the low-fidelity virtual element (e.g., a combined height, width, and depth) are used to construct the bounding volume 501 (e.g., a rectangular box or cube as shown in FIG. 5) within the virtual space at a position determined by the virtual coordinates of the rendered HTML element of the digital content presented in the frame. Although a box is shown in this example, other volumes may be chosen in which to render the low fidelity virtual element.

The low-fidelity virtual element is rendered within a bounding volume 501 as shown in FIG. 5. In one example, position of the bounding volume is linked or anchored to the rendered html document within the 3-D space. For example, the bounding volume is positioned spatially adjacent to the center of the rendered view of the HTML element that tethered the virtual element (e.g., at a location corresponding to the location at which the thumbnail image was rendered). In one example, the bounding volume is anchored to the rendering of the content at the determined position so that, for example, if the user changes what HTML content is rendered within the frame (e.g., in response to a user input such as a scroll input event), the rendering of the low-fidelity virtual element appears to move with the corresponding anchored location of the rendered HTML element within the document. If the movement of the content within the frame causes the anchor location to move outside of the view rendered in the frame, rendering of the low-fidelity virtual element ceases until the corresponding position within the HTML document is once again rendered within the view of the frame. In addition, switching between different content shown in the frame (e.g., switching a tab to render a different page) causes rendering of the low-fidelity virtual element to cease.

In addition, the bounding volume 501 provides constraints in which a user can manipulate and transform the low-fidelity virtual element. For example, the volume defines a position within the 3-D virtual space in which a user may interact with the low-fidelity virtual element. In one example, the user may move, rotate, scale, or otherwise interact with the low-fidelity virtual element within the boundaries of the volume. For example, a real world element, such a hand 503 may be detected by the client system according to a corresponding point cloud 504 within the virtual space that interacts with the low-fidelity virtual element by applying forces to the low-fidelity virtual element to manipulate the low-fidelity virtual element within the volume or by recognizing features of the hand 503 corresponding to a user input, such as a recognized gesture.

In addition, the bounding volume also may be used to control rendering of a high-fidelity virtual element. For example, the client system may use the bounding volume as a virtual boundary to control accessing, loading, and/or downloading and rendering of a high-fidelity virtual element. In one example, if the user's interaction moves the low-fidelity virtual element relative to a boundary of the volume, the interaction may be used as trigger to start accessing, loading, and/or downloading of the high-fidelity virtual element and ultimately render the high-fidelity virtual element within the virtual space. For example, if the user's interaction moves the low-fidelity virtual element outside of the boundary or a portion of the low-fidelity virtual element (e.g., a percentage of the rendered low-fidelity virtual element) outside of the volume boundary, the downloading and rendering process of the high-fidelity virtual element may be commenced. In another example, a defined complex user interaction (e.g., a combination of several events) may be used as the trigger to download and render the high-fidelity virtual element. For example, the complex user interaction may be a "grab" action or input to move the low-fidelity virtual element outside of the volume and a "release" action or input outside of the volume trigger the downloading and rendering of the high-fidelity virtual element.

Figure 6:
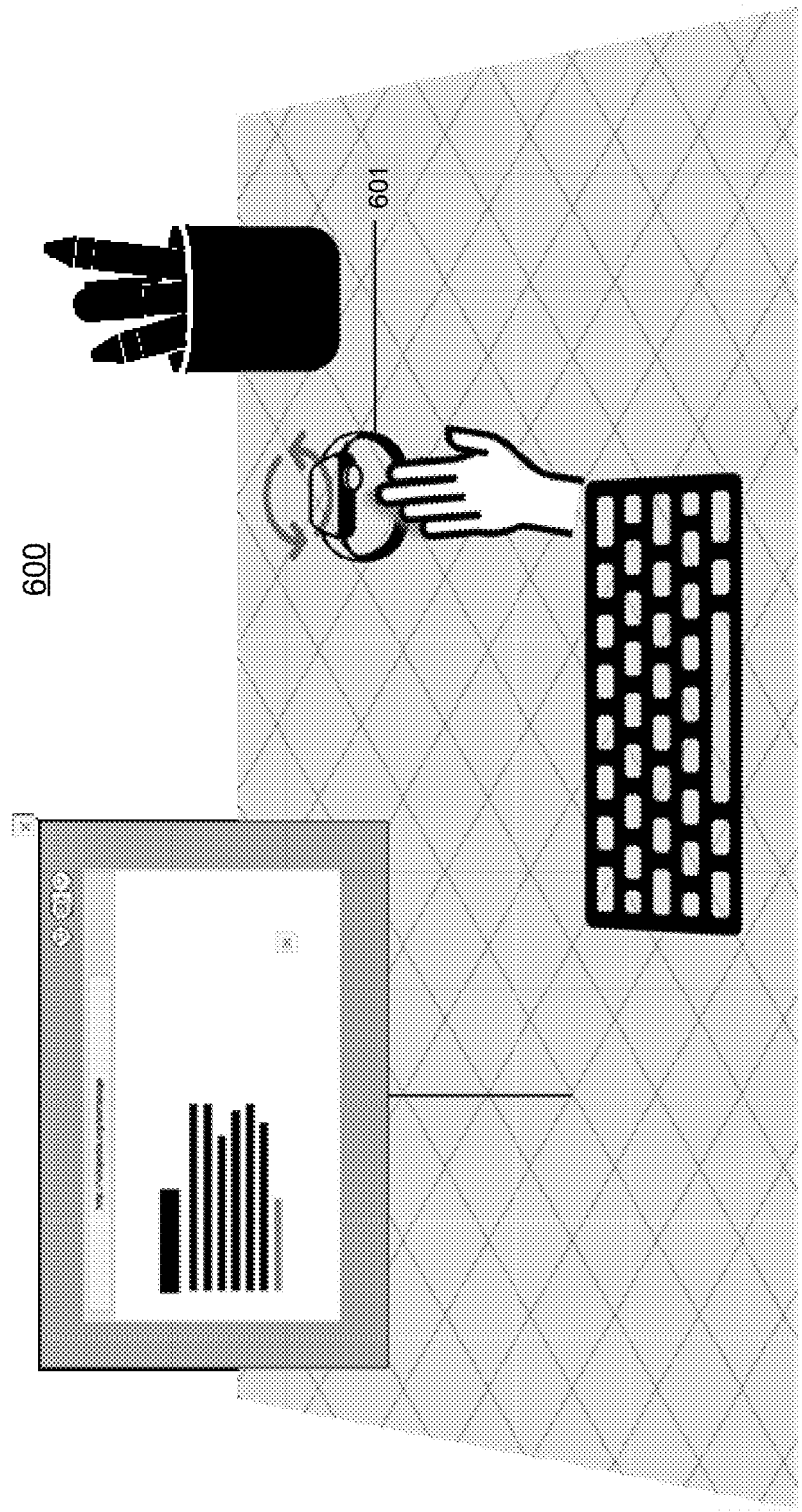
FIG. 6 illustrates an example of a representation of a 3-D workspace including a representation of an untethered low fidelity 3-D virtual element.

FIG. 6 illustrates an example 600 of a representation of a 3-D virtual space including a representation of an untethered low-fidelity 3-D virtual element 601. As shown in FIG. 6, a low-fidelity virtual element is rendered within the 3-D virtual space. In one example, the low-fidelity virtual element may be rendered during the time when the high-fidelity virtual element is downloaded. For example, this may be useful for a client system that has restricted bandwidth that results in slower download times for virtual elements that have larger amounts of data associated therewith. The low-fidelity virtual element may be manipulated by the user within the 3-D virtual environment according to the parameters, elements, metadata and/or attributes used to model and render the low-fidelity virtual element in the virtual 3-D space. In the example shown in FIG. 6, a user is shown rotating the view of the low-fidelity virtual element within the 3-D virtual environment.

Figure 7:
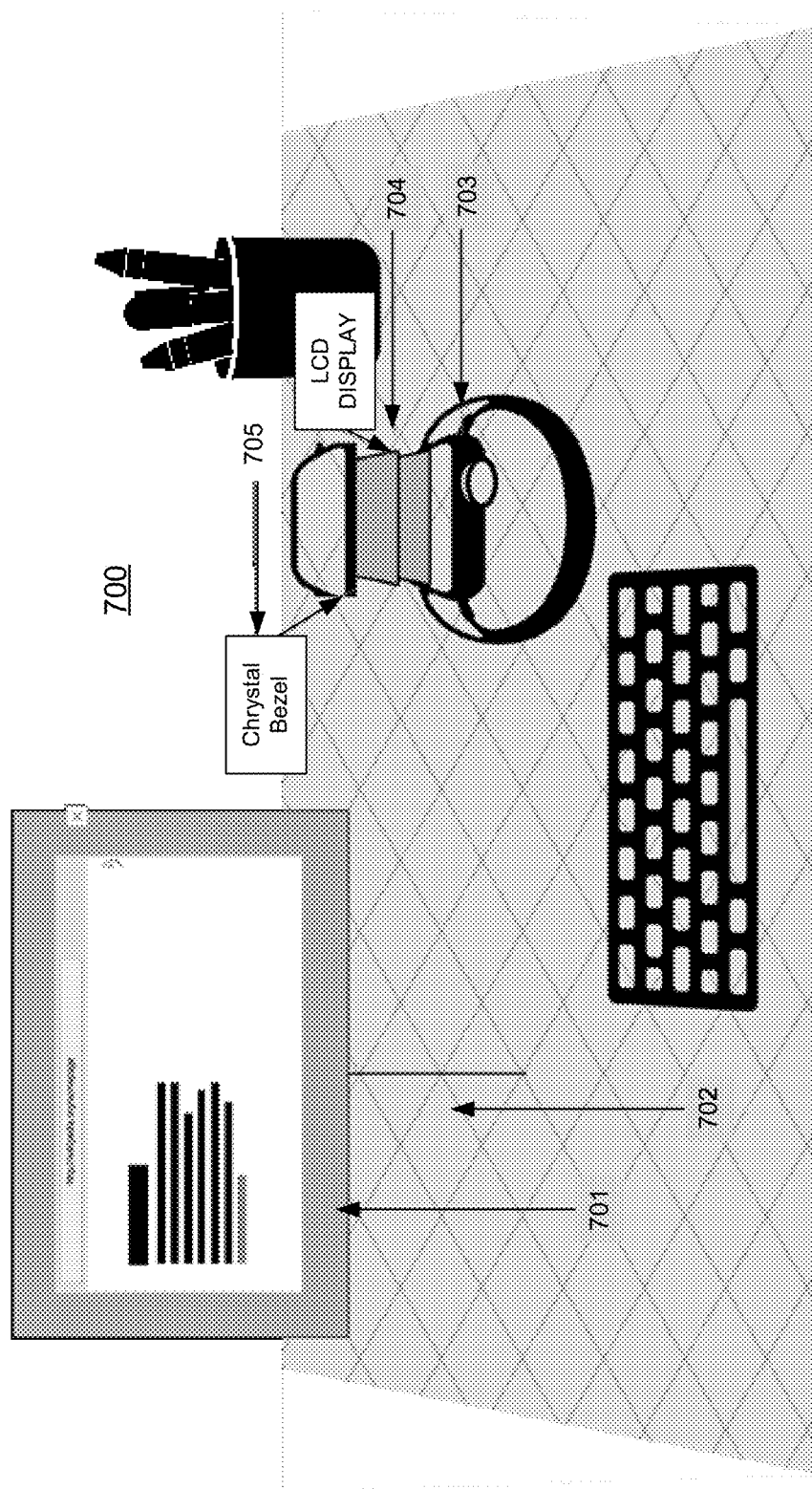
FIG. 7 illustrates an example of a representation of a 3-D workspace including a representation of high fidelity 3-D virtual element.

FIG. 7 illustrates an example 700 of a representation of a 3-D workspace including a representation of high-fidelity 3-D virtual element. Once the model for the high-fidelity virtual element is accessed, loaded, and/or downloaded, the client system replaces the rendered low-fidelity virtual element by rendering a high-fidelity virtual element at the position in which the low fidelity virtual element was previously rendered according to the parameters, elements, metadata and/or attributes used to model and render the high-fidelity model. Depending on the metadata associated with the high-fidelity virtual element, the client system may perform one or more transformations. For example, the client system may scale and orient the high-fidelity virtual element to prep the element for interaction. During the prep time, the low-fidelity virtual element is active and responds to user interaction within the virtual space. In one example, a visual indicator may be used to report on the progress of the full-poly download. As shown in FIG. 7, once fully downloaded, the high-fidelity virtual element 703 is rendered in the workspace 702, untethered from frame 701. The high-fidelity virtual element replaces the previously rendered low-fidelity virtual element. Once in the workspace, any additional metadata or transformations may be triggered. For example, one or more of annotations 705, animations, or transformations, such as an exploded view 704 may be provided as determined by the metadata and attributes downloaded for the high-fidelity virtual element.

System Components

Figure 8A:
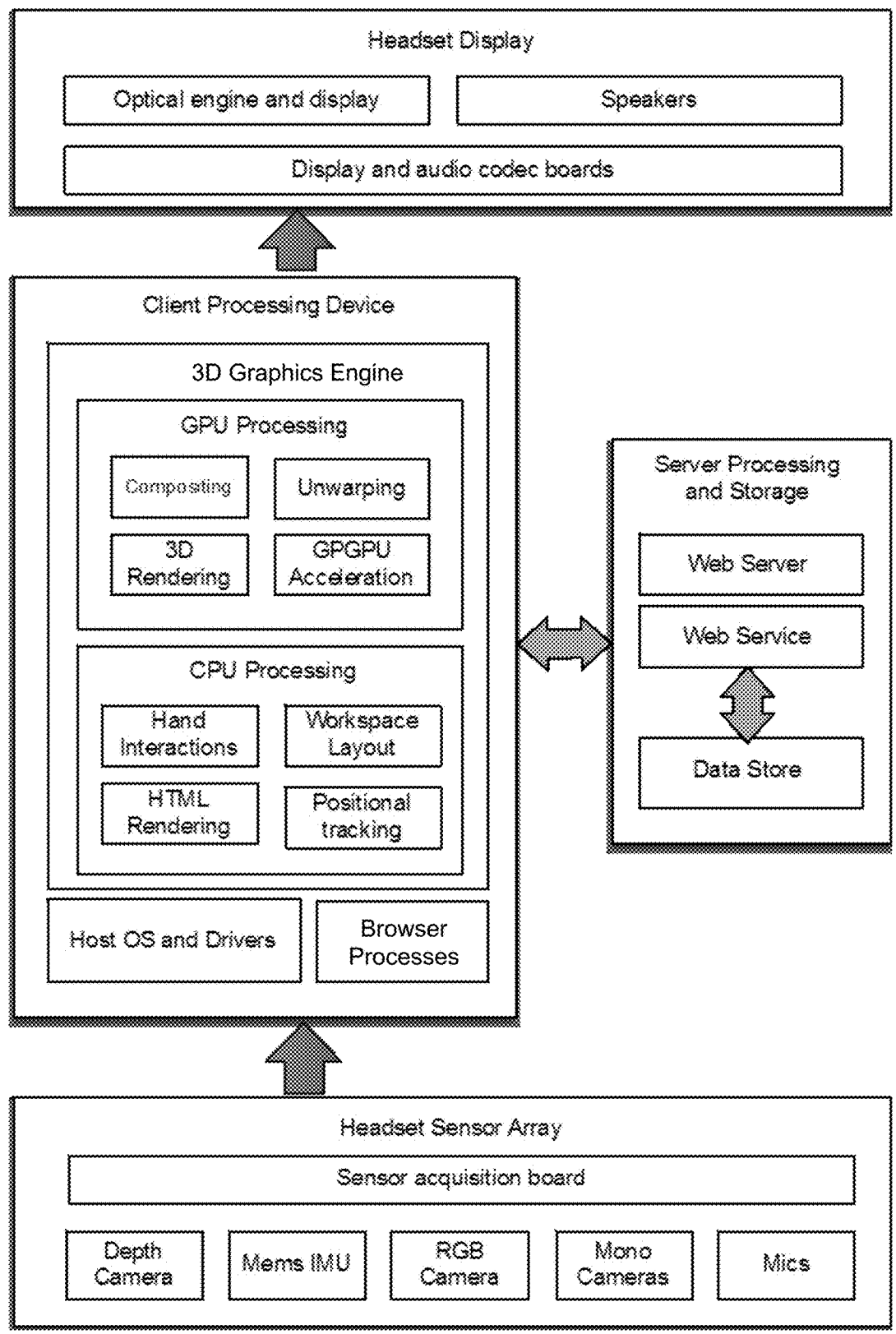
FIG. 8A shows a block diagram illustrating some components of a system for processing, access, and interaction with a virtual element tethered in content.

FIG. 8A shows a block diagram illustrating some components of a system for processing, access, and interaction with a virtual element tethered in digital content. As shown the client system includes a headset display, sensor array, and client processing device. The client system communicates with at least one server processing and storage system.

As shown in FIG. 8, left and right eye image frames and four channel audio frames are encoded by the client processing device and transmitted over an HDMI to the headset display, where the image frames are displayed through the optical engine and the audio frames are played over four near-ear speakers.

As shown in this example, the client processing system implements a 3-D graphics engine or platform (e.g., Unity, Unreal, or WebGL), which may include one or more of a rendering engine ("renderer") for 3D graphics, a physics engine or collision detection (and collision response), sound, scripting, animation, artificial intelligence, networking, streaming, memory management, threading, localization support, scene graphs, and may include video support for cinematics. The graphics engine renders the workspace stereoscopically using shaders, which run on a graphics processing unit (GPU). In addition, browser processes (e.g., Chromium) may be used to render web content from online publishers into RGB buffers, which are texture mapped onto panels or frames in the 3D workspace. In one example, virtual elements (e.g., high-fidelity and low-fidelity virtual elements) may be represented as mesh geometry and rendered in the shaders according to a model of the virtual element as specified by the object's parameters, elements, metadata, and/or attributes. These different buffers are rendered stereoscopically then composited together and into left and right eye buffers. Finally, the left and right eye buffers are pre-warped with the inverse of the geometry of the optical engine to create the final left and right eye images. Audio may be rendered according HRTF models so that sound emitted from objects localized to the user, given the relative location of the four speakers on the headset to the pinna.

In this example, the 3-D graphics engine or platform manages the state of a 3-D virtual space. For example, the process requests web content from remote web servers, parsing HTML on Chromium processes. As described above, when virtual elements are found tethered in the digital content (e.g., HTML content, such as a webpage), the virtual element may be retrieved through web services, which access and persist virtual elements in an online data storage or database, or from a memory or storage device of the client system if previously retrieved from the data store. In one example, business logic in the web service determines whether the user is authorized to view content of the virtual element. The data store of the server system, stored both the high and low-fidelity representations or models of the virtual elements. The server system also may store a state required to render a 3-D virtual space and evaluate the position of virtual elements in the user's physical environment. Virtual elements may be anchored to 3-D virtual coordinates and/or to corresponding the physical world coordinates using positional tracking, which localizes the user to the physical environment.

The 3-D graphics engine or platform includes coding that, for example, pulls the data frames from client system drivers and places frames into queues for hand interaction and positional tracking algorithms to consume. The hands interaction algorithms consume depth frames to create a point cloud from which it computes interaction forces or hand feature tracking to determine user inputs (such as user gestures). Positional tracking algorithms consume IMU and camera frames to localize the user in the environment using a SLAM algorithm. In this example, data is acquired from the sensors. In one example, a sensor acquisition board timestamps, frames, and packages the data and sends the data over a USB connection to the client processing device. In this example, the Mems IMU includes a gyroscope and accelerometer, which may facilitate determining the orientation of the user.

Figure 8B:
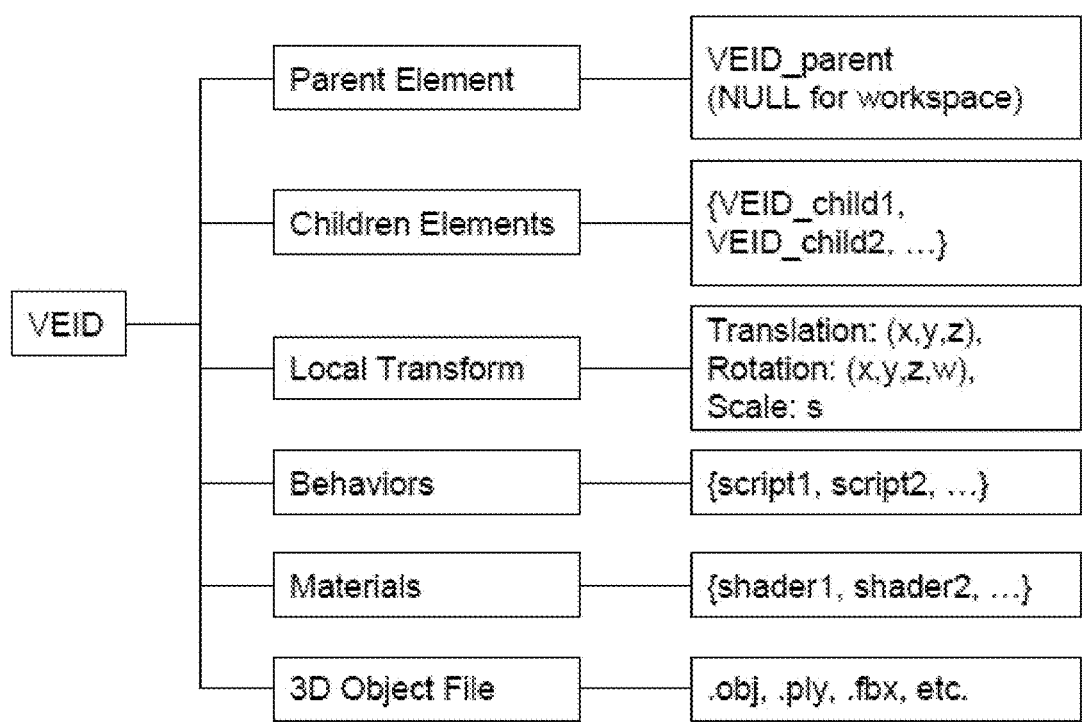
FIG. 8B shows an illustration of a data structure for a virtual element.

FIG. 8B shows one exemplary illustration of a data structure for a virtual element. The element includes and ID, parent element, child elements, local transforms, behaviors, materials, and a parameter file. The data associated with this structure may be used by the 3-D graphics engine to render a high or low-fidelity object.

FIGS. 9A, 9B, 9C, 9D, 9E, and 9F show examples of a system implementation for tethering and manipulating 3-D virtual elements.

FIGS. 9A, 9B, 9C, 9D, and 9E show examples of an implementation of the client system using a head mounted display (HMD), which integrates a display or projector and optics to provide a stereoscopic optical system.

Figure 9A:
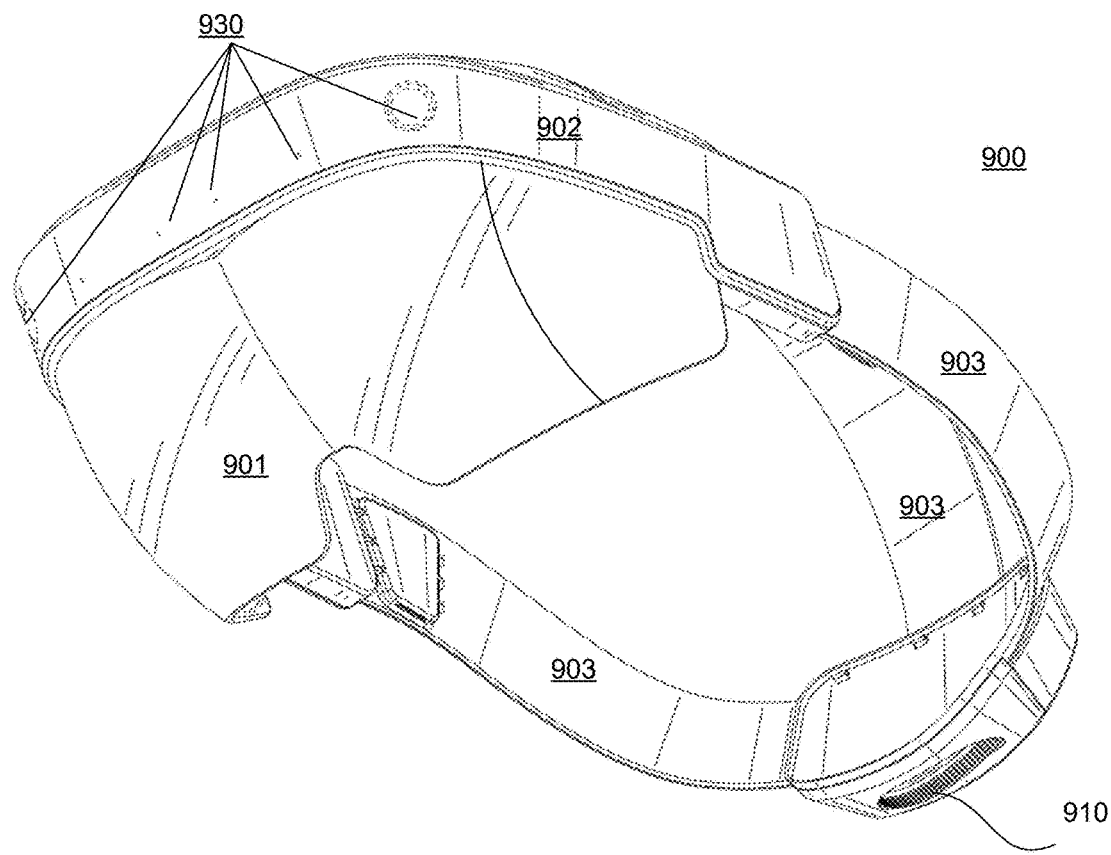
FIGS. 9A, 9B, 9C, 9D, 9E, and 9F show examples of a head mounted display and system implementation for tethering and manipulating 3-D virtual elements.
Figure 9B:
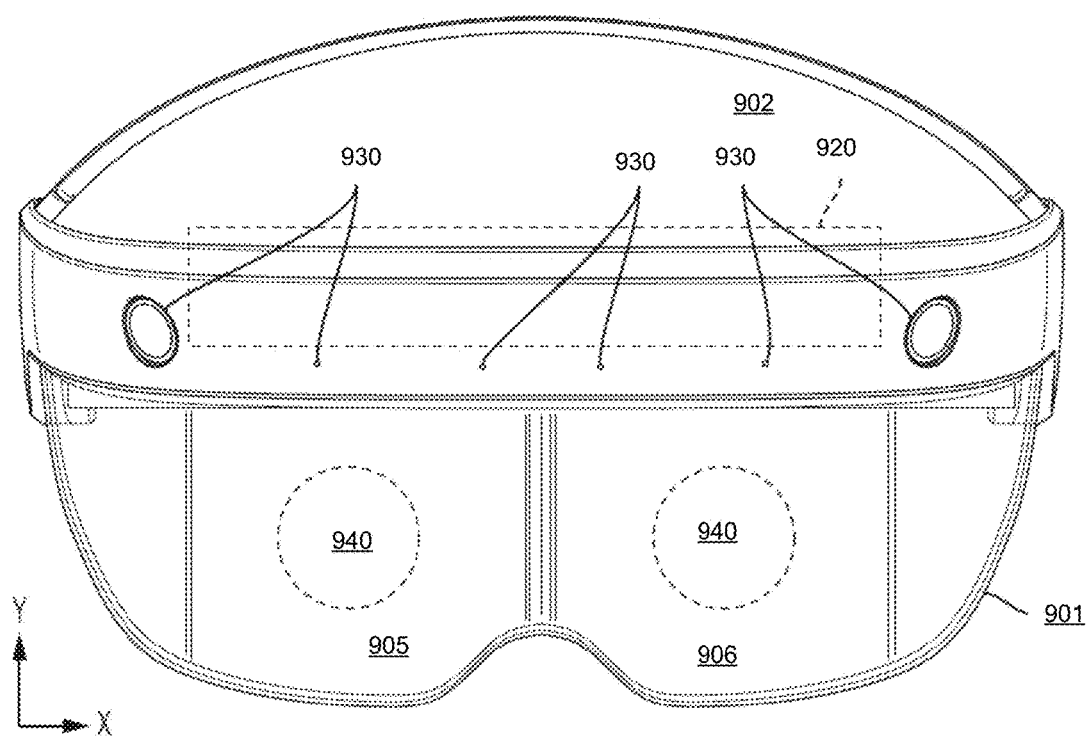
Figure 9C:
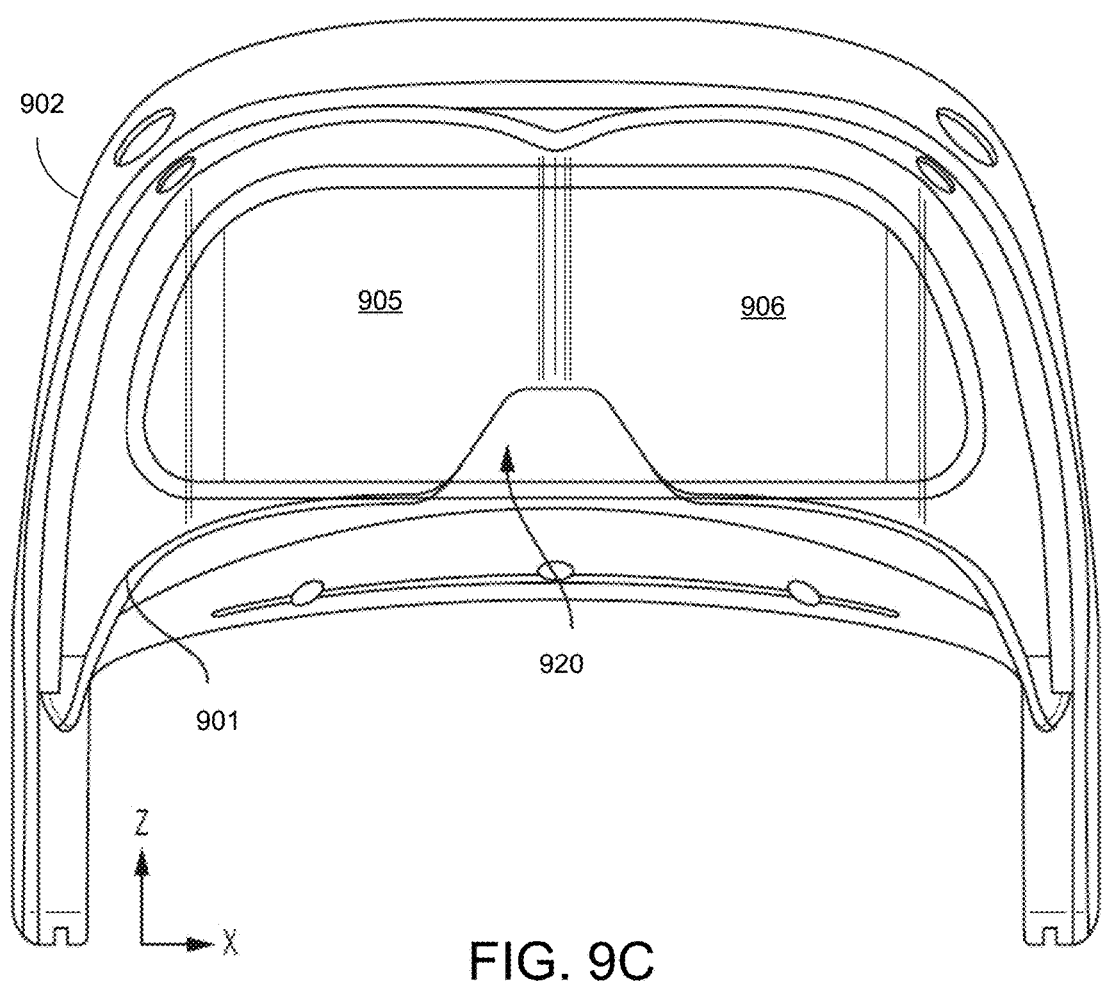

FIGS. 9A, 9B, 9C shows a perspective view, front view, and bottom view, respectively, of one example of an HMD 900. As shown the HMD includes a visor 901 attached to a housing 902, straps 903, and a mechanical adjuster 910 used to adjust the position and fit of the HMD to provide comfort and optimal viewing by a user of the HMD 900. The visor 901 may include one or more optical elements, such as an image combiner, that includes a shape and one or more reflective coatings that reflect an image from an image source 920 to the eyes of the user. In one example, the coating is partially reflective allowing light to pass through the visor to the viewer and thus create a synthetic image in the field of view of the user overlaid on the user's environment and provide an augmented reality user interface. The visor 901 can be made from a variety of materials, including, but not limited to, acrylic, polycarbonate, PMMA, plastic, glass, and/or the like and can be thermoformed, single diamond turned, injection molded, and/or the like to position the optical elements relative to an image source and eyes of the user and facilitate attachment to the housing of the HMD.

In one implementation, the visor 901 may include two optical elements, for example, image regions 905, 906 or clear apertures. In this example, the visor 901 also includes a nasal or bridge region, and two temporal regions. Each image region is aligned with the position 940 of one eye of a user (e.g., as shown in FIG. 9B) to reflect an image provided from the image source 920 to the eye of a user of the HMD. A bridge or nasal region is provided between the two image regions to connect the two regions 905 and 906. The image regions 905 and 906 mirror each other through the y-z plane that bisects the nasal rejoin. In one implementation, the temporal region extends to an outer edge of the image region wrapping around the eyes to the temple housing of the HMD to provide for peripheral vision and offer support of the optical elements such that the image regions 905 and 906 do not require support from a nose of a user wearing the HMD.

Figure 9D:
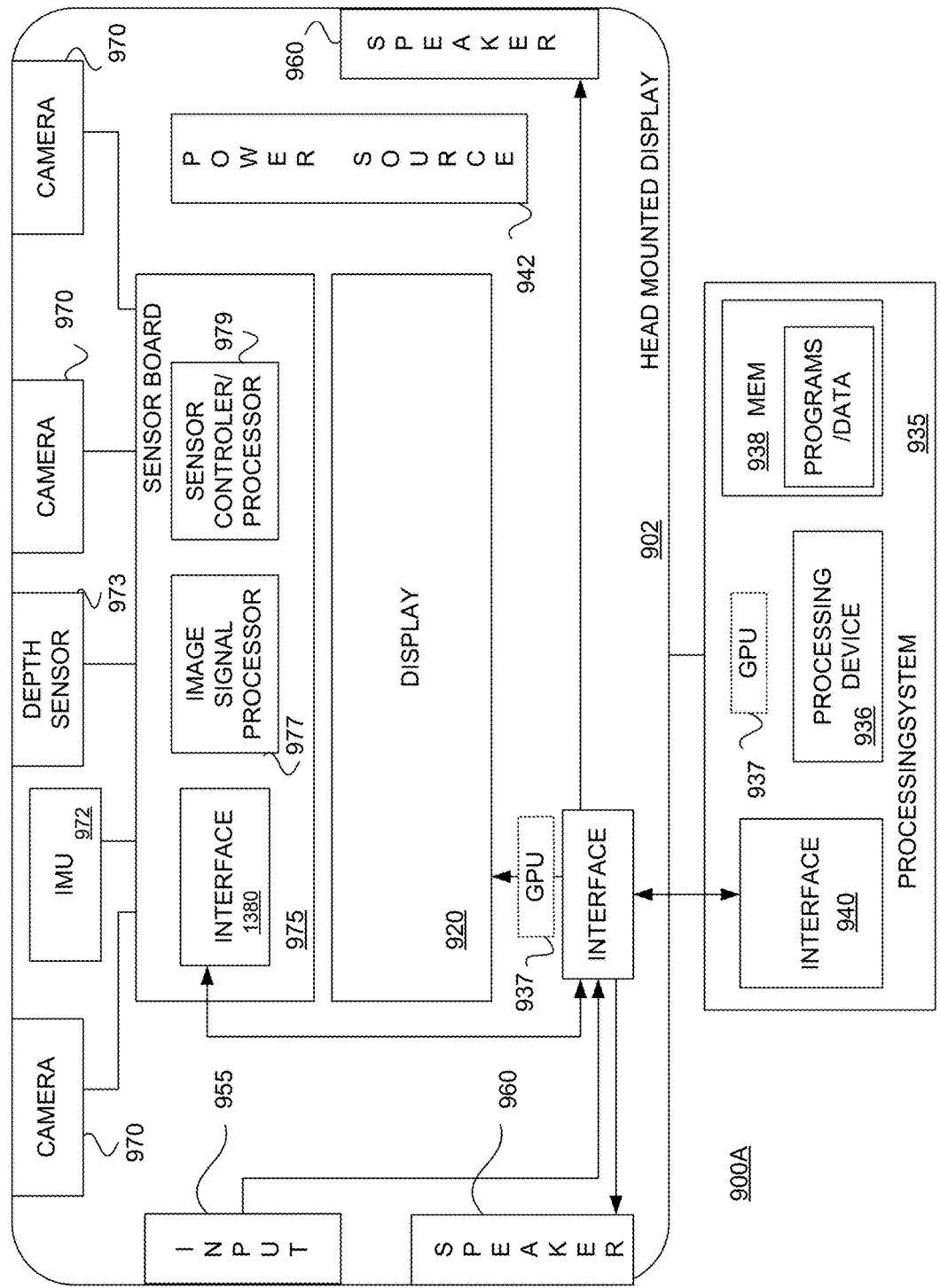
Figure 9E:
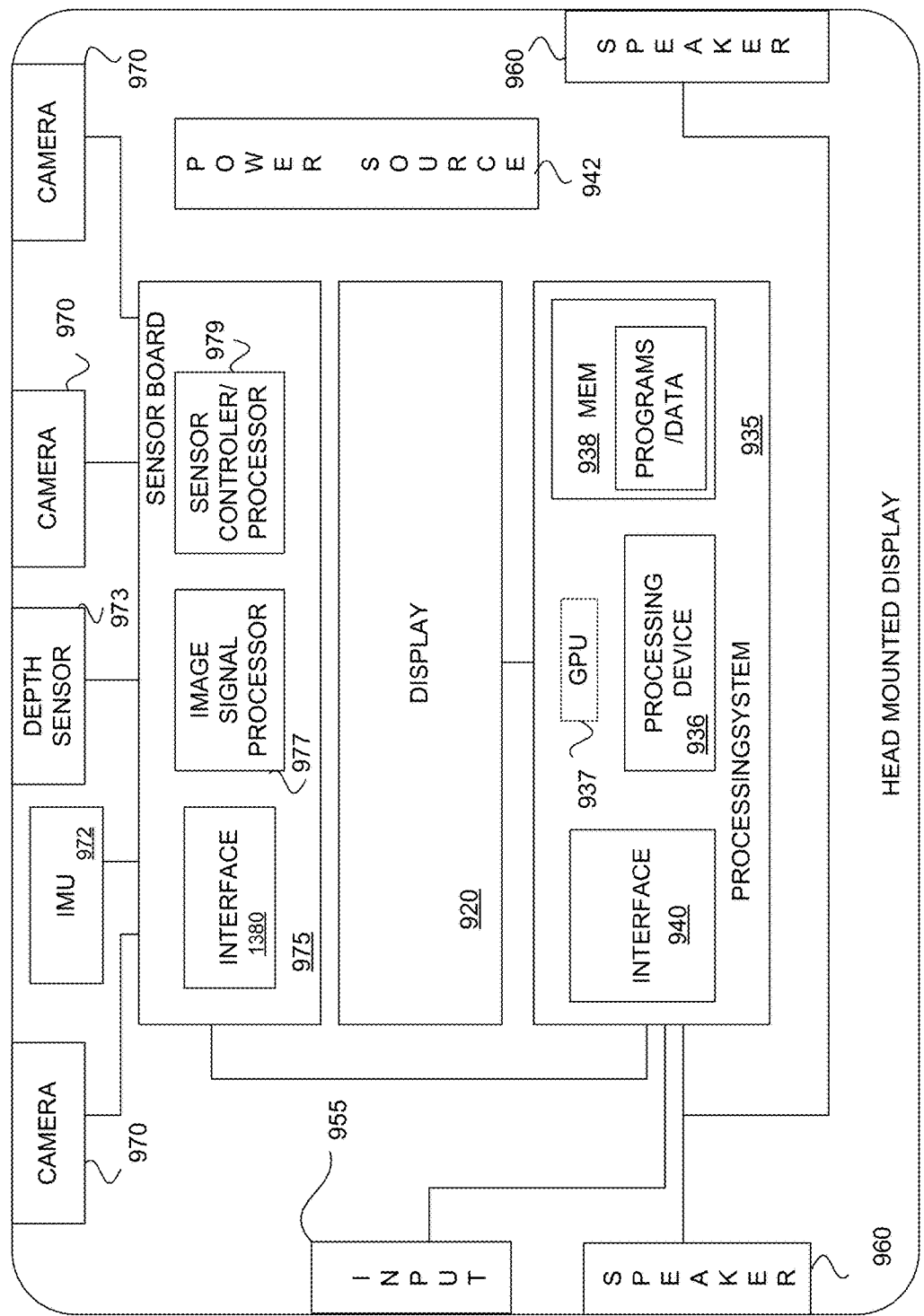

In one implementation, the housing may include a molded section to roughly conform to the forehead of a typical user and/or may be custom-fitted for a specific user or group of users. The housing may include various electrical components of the system, such as sensors 930, a display or projector, a processor, a power source, interfaces, a memory, and various inputs (e.g., buttons and controls) and outputs (e.g., speakers) and controls in addition to their various related connections and data communication paths. FIG. 9D shows an example of a HMD 900B in which the processing device 961 is implemented outside of the housing 902 and connected to components of the HMD using an interface (e.g. a wireless interface, such as Bluetooth or a wired connection, such as a USB wired connector). FIG. 9E shows an implementation in which the processing device is implemented inside of the housing 902.

The housing 902 positions one or more sensors 930 that detect the environment around the user. In one example, one or more depth sensors are positioned to detect objects in the user's field of vision. The housing also positions the visor 901 relative to the image source 920 and the user's eyes. In one example, the image source 920 may be implemented using one or more displays or projectors. For example, the image source may be a single display. If an optical element 905, 906 of the visor is provided for each eye of a user, the display may be partitioned into at least two halves. For example, each half may display an image intended for a separate eye. In another example, two displays may be provided. In this example, each display is paired with a corresponding optical element or image area, where each pair provides an image to an eye of the user. Examples of displays include a liquid crystal display (LCD), a Light Emitting Diode (LED) display, a flexible organic LED (OLED) display, and a Liquid Crystal on Silicon (LCoS or LCOS). In one example, a single 4.5- to 5.2-inch diagonal Liquid Crystal Display (LCD) may be used. In another example, dual 2.8-3.4-inch diagonal LCDs, one for each eye, may be used.

In one implementation, the display may be part of a mobile phone or other mobile device that is separate from, but placed within and/or affixed to, the HMD and/or HMD housing and is subsequently detachable or removable therefrom. For example, a user-accessible opening may be provided to accept and position a mobile phone or other mobile device with a display to provide an image source for the HMD. In this example, a hatch or a slot is configured to accept the mobile phone or other mobile device and provide access to a guide, a rail, one or more walls, or a shelf to position the display of the mobile device or mobile phone outside the field of view and at the geometries according to the descriptions and examples provided herein. In yet another example, an opening may provide one or more fasteners, such as a clip or deformable member that accept and detachably lock and position the display of the mobile device or mobile phone outside the field of view and at the geometries allowing reflection to the user's eyes.

As shown in FIGS. 9D and 9E, a processing device may implement applications or programs for implementing the processes in FIGS. 1 and 2 as outlined above. In one example, the processing device includes an associated memory storing one or more applications implemented by the processing device that generate digital image data depicting one or more of graphics, a scene, a graphical user interface, a computer game, a movie, content from the Internet, such as web content accessed from the World Wide Web, among others, that are to be presented to a viewer of the wearable HMD. Examples of applications includes media players, mobile applications, browsers, video games, and graphic user interfaces, to name but a few. In addition, the applications or software may be used in conjunction with other system processes. For example, an unwarping process and a visual accommodation process for alignment and to compensate for distortion induced by an optical element of such as system may be included. An example of such a visual accommodation process is described in U.S. Non-provisional application Ser. No. 14/757,464 titled "APPARATUSES, METHODS AND SYSTEMS COUPLING VISUAL ACCOMMODATION AND VISUAL CONVERGENCE TO THE SAME PLANE AT ANY DEPTH OF AN OBJECT OF INTEREST" filed on Dec. 23, 2015, and the unwarping process is described in U.S. Provisional Application No. 62/275,776 titled "APPARATUSES, METHODS AND SYSTEMS RAY-BENDING: SUB-PIXEL-ACCURATE PRE-WARPING FOR A DISPLAY SYSTEM WITH ONE DISTORTING MIRROR" filed on Jan. 4, 2016, both of which are hereby incorporated by reference in their entirety for all purposes.

Figure 9F:
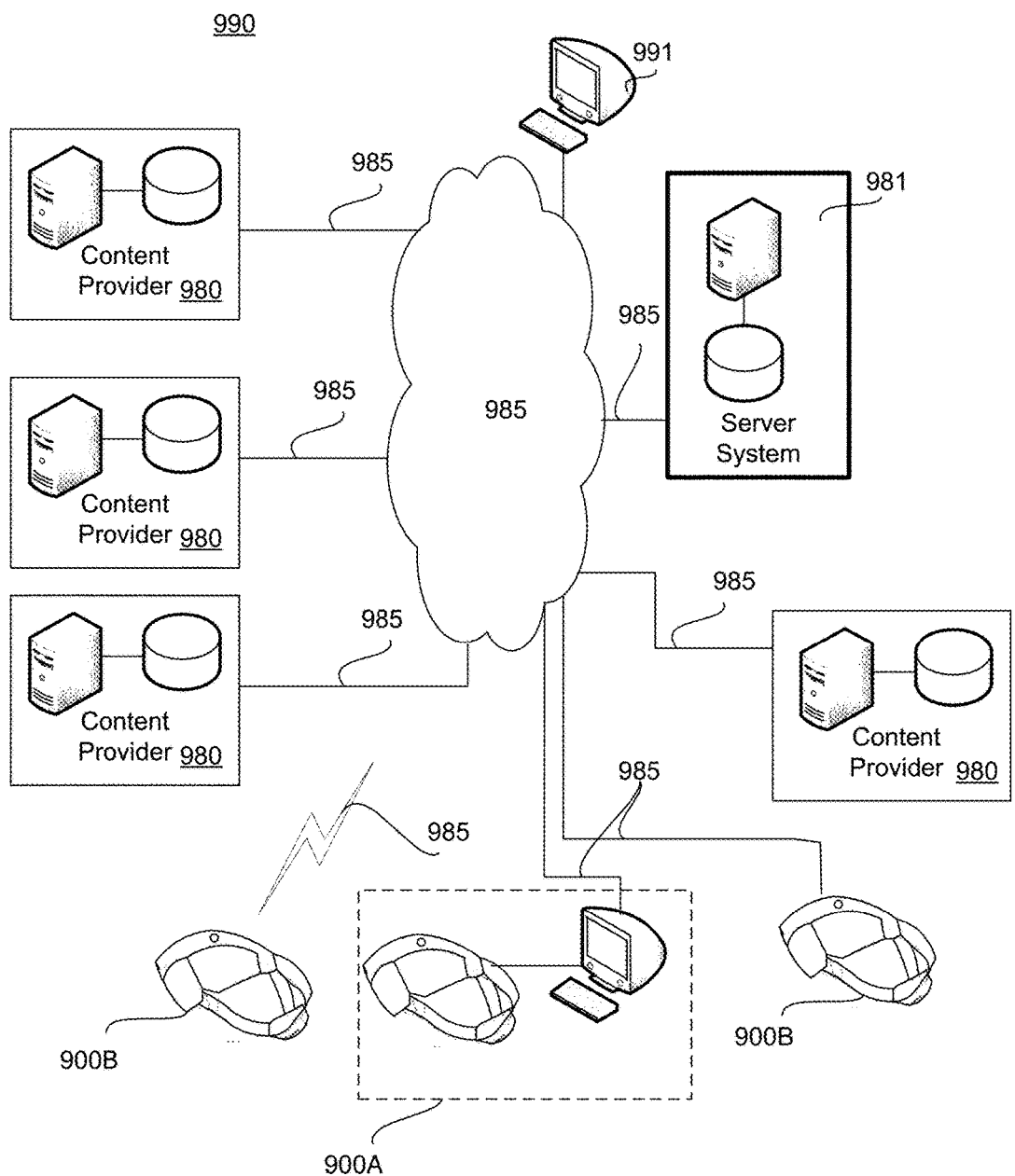

FIG. 9F shows a communications system 990 for tethering 3-D virtual elements in content, for extracting tethered 3-D virtual elements, and for manipulating the extracted 3-D virtual elements in a virtual 3-D space. The system includes a server system 981, a number of content providers 980, and client systems 900A, 900B, and 991, that communicate using communications paths 955. Client system 900A and 900B have AR display systems and are configured to display virtual content and virtual elements. The client system 991 includes a processing device, storage device, and display device; however, the display device cannot render 3-D virtual content, and can only render 2-D content. The content provider systems 980 facilitate access to, organization of, and presentation of content to users in addition to providing many services. Examples of services provided by content provider systems include storefronts, news, blogs, entrainment, social media and networks, content sharing, among many others. The content provider system may store and manage content, such as web pages and websites. The content provider system may store and manage HTML documents in which virtual elements are tethered. The content provider system may include one or more communications devices, processing devices, memories/storage devices, communications interfaces, network devices, and communications paths to store, process, manipulate, organize, consolidate, maintain, and present communications, content, and data to a user of a client device 900A, 900B, and 990.

One or more server systems 981 may be used to manage sharing of virtual elements. For example, the server systems may include one or more communications devices, processing devices, memories/storage devices, communications interfaces, network devices, and communications paths to store, process, manipulate, organize, consolidate, maintain, and provide virtual elements. The server system may implement the server side of the process as shown and described in conjunction with FIGS. 1, 2, and 8. In one example, the server system 981 may include a one or more security devices (e.g., firewalls), web servers, application servers, storage and database systems, and backup memory device. The web servers may provide initial communication with client devices. One or more application servers may be configured to provide authentication, location of low-fidelity virtual elements, high-fidelity virtual elements, workplace management, and layouts, in addition to other services. Servers may provide proxy services and associated memories to provide caching of content. Servers may provide database management services and analytic services and associated memories to store descriptive metadata and analytical information.

It is understood, however, that the example given in FIG. 9F is for illustrative purposes only, and that many different configurations, combinations of devices, and numbers of devices may be provided for any particular server system 981. For example, a cloud architecture also may be used to implement a server system 981, as described below. In addition, although only one of server and storage device is shown in FIG. 9F, it will be appreciated that in actual implementation other configurations of servers or combination of servers may be provided including banks of a number of these machines as necessary may be provided to handle the number of users, data, and traffic handled by a particular implementation of a server system 981.

In addition, server system 981 may be configured to provide a location that is centralized and/or remote from the perspective of the user. The central location may be one physical location, such as a room, building, or campus providing the hardware components of the system. However, in reality the central location may be virtual or distributed where services are provided, content are accessed from, and data is stored over a number of distributed systems and/or geographic locations. In other words, although the server system is shown in FIG. 9F as being a single entity, other configurations wherein the applications, processing, services, content, and data are distributed both in terms of devices and geographical location are within the meaning of the server system 981. Additionally, the server system may use third parties to host or initiate services as needed on demand, for example, using cloud computing wherein the locations and structure providing the services change size, and physical location, distribution, and even equipment dynamically over time.

The communications paths 985 may be configured to send and receive signals (e.g., electrical, acoustic, electromagnetic, or optical) that convey or carry data representing various types of analog and/or digital data including programming, software, media, and content, among others, for presentation to a user. For example, the communications paths may be implemented using various communications media and one or more networks comprising one or more network devices (e.g., network interface cards, fiber media converter, servers, routers, switches, hubs, bridges, repeaters, blades, processors, and storage devices). The one or more networks may include a local area network (LAN), a wide area network (WAN), an Ethernet, a global area network (GAN), a cloud network, a plain old telephone service (POTS) network, a digital subscriber line (DSL) network, an integrated services digital network (ISDN), a synchronous optical network (SONNET)/SDH, Passive and Active Optical Networks (PON or AON), a packet switched network, V.92 telephone network modems, IRDA, USB, Firewire, EIA RS-232, EIA-422, EIA-423, RS-449, RS-485, ITU, T1 and other T-carrier links, and E1 and other E-carrier links, varieties of 802.11, GSM Um radio interface, Bluetooth, IEEE 802.11x Wi-Fi, TransferJet, Etherloop, ARINC 818 Avionics Digital Video Bus, G.hn/G.9960, or a combination of two or more of these networks to name a few.

In addition, the communications paths may include one or more wireless links (e.g., microwave, radio, and satellite) that transmit and receive electromagnetic signals, such as, for example, radio frequency, infrared, and microwave signals, to convey information/data signal using any one of a number of communications protocols, for example, communications links may include IMT-2000, such as 2G (GSM, GPRS, EDGE, EDGE Evolution, CSD, HSCSD), 2.5G, 2.75G, 3G (W-CDMA, HSPDA, HSUPA, UMTS-TDD, FOMA), 4G, 4GLTE, and IEEE 802.11 standards, such as Wi-Fi or WLAN. In one example, a communications path may include the Internet or World Wide Web or components found therein.

The client devices 900A, 900B, and 990, may access digital content from one or more publishers 980. The digital content is provided to the client devices 900A, 900B, and 990 via the communication paths 985 in response to request for the content from the client devices. The digital content may include content that can be presented by the any of the client devices client devices 900A, 900B, and 990. In addition, the digital content may include one or more tethered 3-D virtual elements. While parsing the digital content, the client device 900A, 900B, and 990 may determine the digital content includes a virtual element and contact the server system 981 to access and/or download the virtual element, for example, according to the processes described above. In some embodiments, the client devices access and present a low and a high fidelity model of the virtual element. In some embodiments, the client devices 990 display one or more of a 2-D representation of the virtual element, such as a 2-D image or thumbnail, a message indicating the 3-D content is not available for the system, and error code, and/or a hyperlink to additional information about how to view the 3-D virtual element.

As described above, the techniques described herein for a wearable AR client system can be implemented using digital electronic circuitry, or in computer hardware, firmware, software, or in combinations of them in conjunction with various combiner imager optics. The techniques can be implemented as a computer program product, i.e., a computer program tangibly embodied in a non-transitory information carrier, for example, in a machine-readable storage device, in machine-readable storage medium, in a computer-readable storage device or, in computer-readable storage medium for execution by, or to control the operation of, data processing apparatus or processing device, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in the specific computing environment. A computer program can be deployed to be executed by one component or multiple components of the vision system.

The exemplary processes and others can be performed by one or more programmable processing devices or processors executing one or more computer programs to perform the functions of the techniques described above by operating on input digital data and generating a corresponding output. Method steps and techniques also can be implemented as, special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. The processing devices described herein may include one or more processors and/or cores. Generally, a processing device will also include, or be operatively coupled to receive data from or transfer data to, or both, one or more mass storage devices for storing data, such as, magnetic, magneto-optical disks, or optical disks. Non-transitory information carriers suitable for embodying computer program instructions and data include all forms of non-volatile memory, including by way of example semiconductor memory devices, such as, EPROM, EEPROM, and flash memory or solid state memory devices; magnetic disks, such as, internal hard disks or removable disks; magneto-optical disks; and CD-ROM and DVD-ROM disks. The processor and the memory can be supplemented by, or incorporated in special purpose logic circuitry.

The HMD may include various other components including various optical devices and frames or other structure for positioning or mounting the display or projection system on a user allowing a user to wear the vision system while providing a comfortable viewing experience for a user. The HMD may include one or more additional components, such as, for example, one or more power devices or connections to power devices to power various system components, one or more controllers/drivers for operating system components, one or more output devices (such as a speaker), one or more sensors for providing the system with information used to provide an augmented reality to the user of the system, one or more interfaces from communication with external output devices, one or more interfaces for communication with an external memory devices or processors, and one or more communications interfaces configured to send and receive data over various communications paths. In addition, one or more internal communication links or busses may be provided in order to connect the various components and allow reception, transmission, manipulation and storage of data and programs.

In order to address various issues and advance the art, the entirety of this application (including the Cover Page, Title, Headings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. A computer implemented method of providing interaction with a virtual element embedded in digital content in an augmented or virtual reality environment to a user of a head-mounted display (HMD), the method comprising:
presenting the digital content that is perceived by the user of the HMD as an image in the augmented or virtual reality environment;
detecting a virtual element tethered in the digital content, the virtual element having an associated low-fidelity model and a high-fidelity model specifying how the virtual element is rendered by the HMD in the augmented or virtual reality environment;
determining coordinates of a 3-D bounding volume in the augmented or virtual reality environment;
rendering a first representation of the virtual element perceived by the user of the HMD as a three-dimensional (3-D) object in the augmented or virtual reality environment tethered to the perceived 2-D image based on the low fidelity model where the first representation is rendered within the bounding volume when the virtual element is tethered to the digital content;
determining that a user interaction with the first representation of the virtual element indicates the user has untethered the virtual element from the digital content by detecting a user manipulation of the first representation of virtual element that moves the first representation outside of the bounding volume; and
rendering, in response to the determination of the user interaction, a second representation of the virtual element in place of the first representation that is perceived by the user of the HMD as a 3-D object within the augmented or virtual reality environment based on the high fidelity model.

2. The method of claim 1 further comprising rendering a visual representation of the bounding volume to the user of the HMD.

3. The method of claim 1 wherein the rendering of the first representation of the virtual element based on the low-fidelity model restricts user interaction with the virtual element and the rendering of the second representation of the virtual element based on the high fidelity model provides unrestricted user interaction with the virtual element.

4. The method of claim 1 wherein presenting the digital content perceived by the user of the HMD as an image in the augmented or virtual reality environment includes presenting the virtual element perceived by the user as a 2-D image within the digital content and determining the coordinates of the bounding volume includes determining a size of the 3-D bounding volume based on the size of the volume based on the size of the perceived 2-D image of the virtual element within the digital content.

5. The method of claim 1 wherein the digital content is an HTML document.

6. The method of claim 1 wherein the determined interaction includes a user gesture.

7. The method of claim 1 wherein determining a user interaction includes sensing a position of a user appendage or digit with respect to the perceived 3-D image of the first representation.

8. The method of claim 1 wherein the high-fidelity model includes a plurality of transformations indicating how to render the second representation and the low fidelity model includes a subset of the plurality of transformations.

9. The method of claim 1 further comprising: accessing, by the HMD, the high-fidelity model from a storage device remotely located from the HMD in response to determining the user has untethered the virtual element from the digital content.

10. A head-mounted display (HMD) system providing interaction with a virtual element embedded in digital content in an augmented or virtual reality environment to a user of the HMD, the system comprising:
at least one display;
one or more optical elements configured to provide light from the at least one display to the eyes of the user;
at least one sensor;
a memory; and
one or more processing devices configured by machine-readable instructions stored in the memory to:
present the digital content that is perceived by the user of the HMD as an image in the augmented or virtual reality environment;
detect a virtual element tethered in the digital content, the virtual element having an associated low-fidelity model and a high-fidelity model specifying how the virtual element is rendered by the HMD in the augmented or virtual reality environment;
determine coordinates of a 3-D bounding volume in the augmented or virtual reality environment;
render a first representation of the virtual element perceived by the user of the HMD as a three-dimensional (3-D) object in the augmented or virtual reality environment tethered to the perceived 2-D image, where the first representation is rendered within the bounding volume when the virtual element is tethered to the digital content;
determine, based on input from the at least one sensor, a user interaction with the first representation of the virtual element indicates the user has untethered the virtual element from the digital content where the determined user interaction includes detecting a user manipulation of the first representation of virtual element that moves the first representation outside of the bounding volume; and
render, in response to the determination of the user interaction, a second representation of the virtual element in place of the first representation that is perceived by the user of the HMD as a 3-D object within the augmented or virtual reality environment based on the high fidelity model.

11. The system of claim 10 wherein the one or more processing devices are further configured by machine-readable instructions to render a visual representation of the bounding volume to the user of the HMD.

12. The system of claim 10 wherein the low-fidelity model restricts user interaction with the virtual element and the high fidelity model provides unrestricted user interaction with the virtual element.

13. The system of claim 10 wherein presentation of the digital content perceived by the user of the HMD as an image in the augmented or virtual reality environment includes presenting the virtual element perceived by the user as a 2-D image within the digital content and determination of the coordinates of the bounding volume includes determining a size of the 3-D bounding volume based on the size of the perceived 2-D image of the virtual element within the digital content.

14. The system of claim 10 wherein the digital content is an HTML document.

15. The system of claim 10 wherein the determined interaction includes a user gesture.

16. The system of claim 10 wherein a determination of a user interaction includes determining the position of a user appendage or digit with respect to the perceived 3-D image of the first representation.

17. The system of claim 10 wherein the high-fidelity model includes a plurality of transformations indicating how to render the second representation and the low fidelity model includes a subset of the plurality of transformations.

18. The system of claim 10 wherein the one or more processing devices are further configured by machine-readable instructions to access the high-fidelity model from a storage device remotely located from the HMD in response to determining the user has untethered the virtual element from the digital content.

* * * * *